US012541160B2

(12) United States Patent
Akazawa et al.

(10) Patent No.: US 12,541,160 B2
(45) Date of Patent: Feb. 3, 2026

(54) IMAGE FORMING APPARATUS

(71) Applicant: Konica Minolta, Inc., Tokyo (JP)

(72) Inventors: Takashi Akazawa, Hachioji (JP); Takefumi Nishio, Hachioji (JP); Toshihiro Wazumi, Hachioji (JP); Ryoei Ikari, Tokorozawa (JP); Kei Yuasa, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/890,028

(22) Filed: Sep. 19, 2024

(65) Prior Publication Data

US 2025/0102962 A1 Mar. 27, 2025

(30) Foreign Application Priority Data

Sep. 27, 2023 (JP) ................................ 2023-166074

(51) Int. Cl.
*G03G 15/08* (2006.01)
*G03G 21/16* (2006.01)
*G03G 21/20* (2006.01)

(52) U.S. Cl.
CPC ..... *G03G 15/0898* (2013.01); *G03G 15/0891* (2013.01); *G03G 21/1647* (2013.01); *G03G 21/206* (2013.01)

(58) Field of Classification Search
CPC ........... G03G 15/0889; G03G 15/0891; G03G 15/0898; G03G 21/1647; G03G 21/206
See application file for complete search history.

(56) References Cited

U.S. PATENT DOCUMENTS

| | | | | |
|---|---|---|---|---|
| 2018/0203375 | A1* | 7/2018 | Sato | G03G 15/0889 |
| 2019/0129328 | A1* | 5/2019 | Watanabe | G03G 15/0848 |
| 2022/0121151 | A1* | 4/2022 | Sakurai | G03G 21/206 |
| 2023/0408975 | A1* | 12/2023 | Yamazaki | G03G 21/206 |
| 2024/0176271 | A1* | 5/2024 | Shimizu | G03G 15/0898 |

FOREIGN PATENT DOCUMENTS

| | | | |
|---|---|---|---|
| JP | H09-211974 | A | 8/1997 |
| JP | 2005-099239 | A | 4/2005 |
| JP | 2021-184038 | A | 12/2021 |

* cited by examiner

*Primary Examiner* — Sophia S Chen
(74) *Attorney, Agent, or Firm* — LUCAS & MERCANTI, LLP

(57) ABSTRACT

An image forming apparatus includes a developing device that develops a latent image by causing toner to adhere to the latent image via a toner carrier disposed opposite a latent image carrier on which the latent image is formed. The developing device includes a drive transmitter that transmits a driving force to a toner conveyor that conveys the toner, and the drive transmitter performs switching between a first operation of transmitting the driving force for conveying the toner to the toner conveyor and a second operation of vibrating a preventer that is provided in the developing device and prevents the toner from scattering.

10 Claims, 17 Drawing Sheets

IMAGE FORMING APPARATUS

CROSS-REFERENCE TO RELATED APPLICATIONS

The entire disclosure of Japanese Patent Application No. 2023-166074, filed on Sep. 27, 2023, including description, claims, drawings and abstract is incorporated herein by reference.

BACKGROUND OF THE INVENTION

Technical Field

The present invention relates to an image forming apparatus.

Description of Related Art

An image forming apparatus using an electrophotographic process technology charges, with a charging device, a surface of a photosensitive drum serving as a latent image carrier. Next, the image forming apparatus forms an electrostatic latent image on the surface of the photosensitive drum by emitting laser light based on the image data. Next, the image forming apparatus visualizes the electrostatic latent image by supplying a developer to the photosensitive drum from a developing device, to form a toner image on the photosensitive drum. Next, the image forming apparatus transfers and fixes the toner image onto a sheet, to form an image on the sheet.

In such an image forming apparatus, there is a problem that the toner adhered and accumulated on the developing device drops at the time of image formation, adheres to the photosensitive drum, and is transferred to the transfer belt, thereby causing image defect such as image contamination.

In response to such a problem. Japanese Unexamined Patent Publication No. H 09-211974. Japanese Unexamined Patent Publication No. 2005-099239 and Japanese Unexamined Patent Publication No. 2021-184038 disclose an image forming apparatus including a vibration section to apply vibration to a housing of a developing device to suppress toner accumulation in the developing device.

SUMMARY OF THE INVENTION

However, the vibrating means described in Japanese Unexamined Patent Publication No. H 09-211974. Japanese Unexamined Patent Publication No. 2005-099239 and Japanese Unexamined Patent Publication No. 2021-184038 includes a tapping section that taps the housing of the developing device, which is a dedicated component for providing vibration to the housing of the developing device, and a movable section that moves the tapping section. In a case of providing the vibration generator in the image forming apparatus, a space for providing the vibration generator is required in the apparatus. Therefore, there are problems in that the size of the apparatus increases and the cost increases.

An object of the present invention is to provide an image forming apparatus capable of suppressing an image defect due to toner accumulated in a developing device while suppressing an increase in size or cost of the apparatus.

To achieve at least one of the abovementioned objects, according to an aspect of the present invention, an image forming apparatus reflecting one aspect of the present invention includes: a developing device that develops a latent image by causing toner to adhere to the latent image via a toner carrier disposed opposite a latent image carrier on which the latent image is formed, wherein the developing device includes a drive transmitter that transmits a driving force to a toner conveyor that conveys the toner, and the drive transmitter performs switching between a first operation of transmitting the driving force for conveying the toner to the toner conveyor and a second operation of vibrating a preventer that is provided in the developing device and prevents the toner from scattering.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

First Embodiment

<1. Configuration of Image Forming Apparatus 1>

Figure 1:
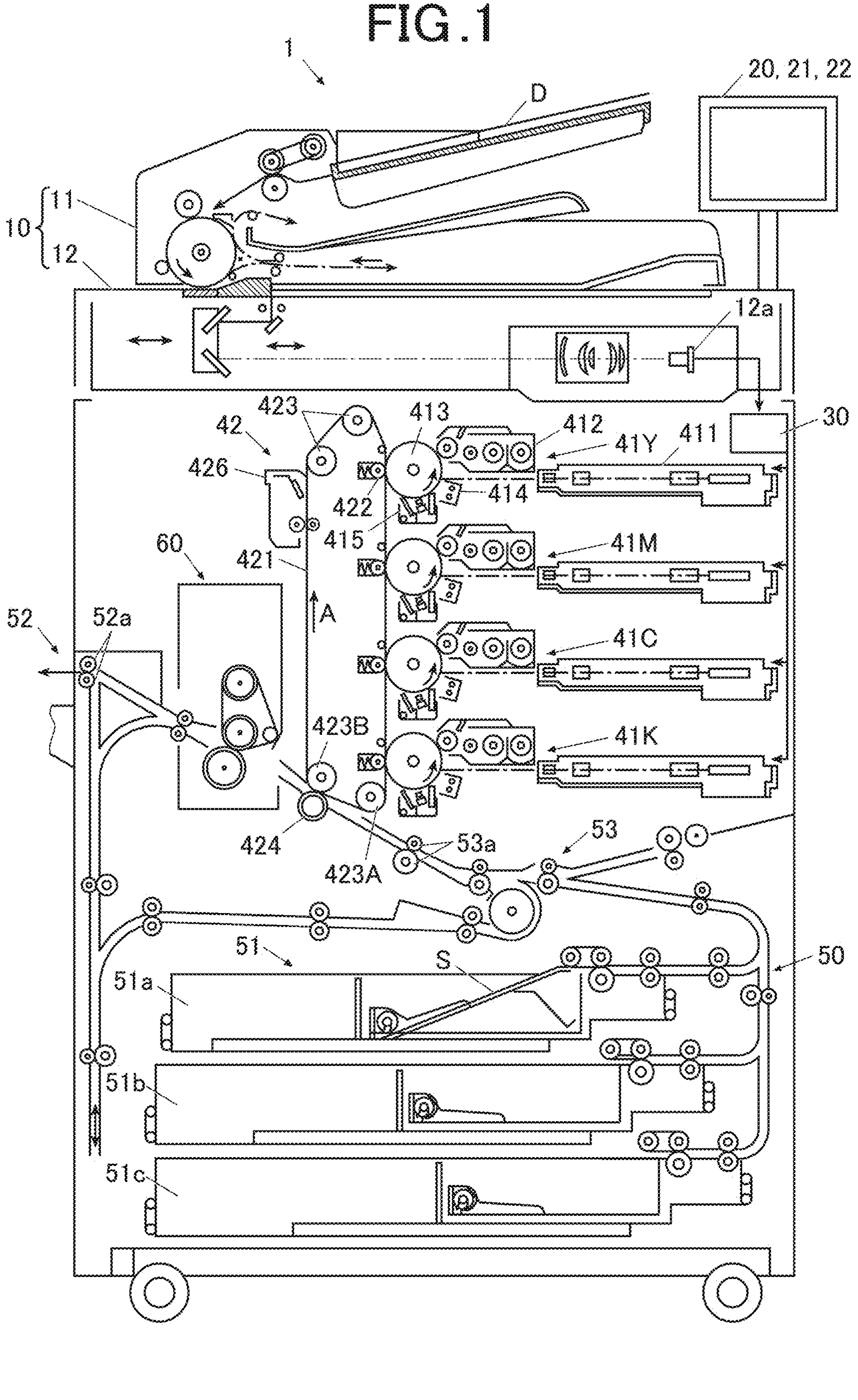
FIG. 1 is a diagram illustrating a schematic configuration of the image forming apparatus according to the first embodiment.
Figure 2:
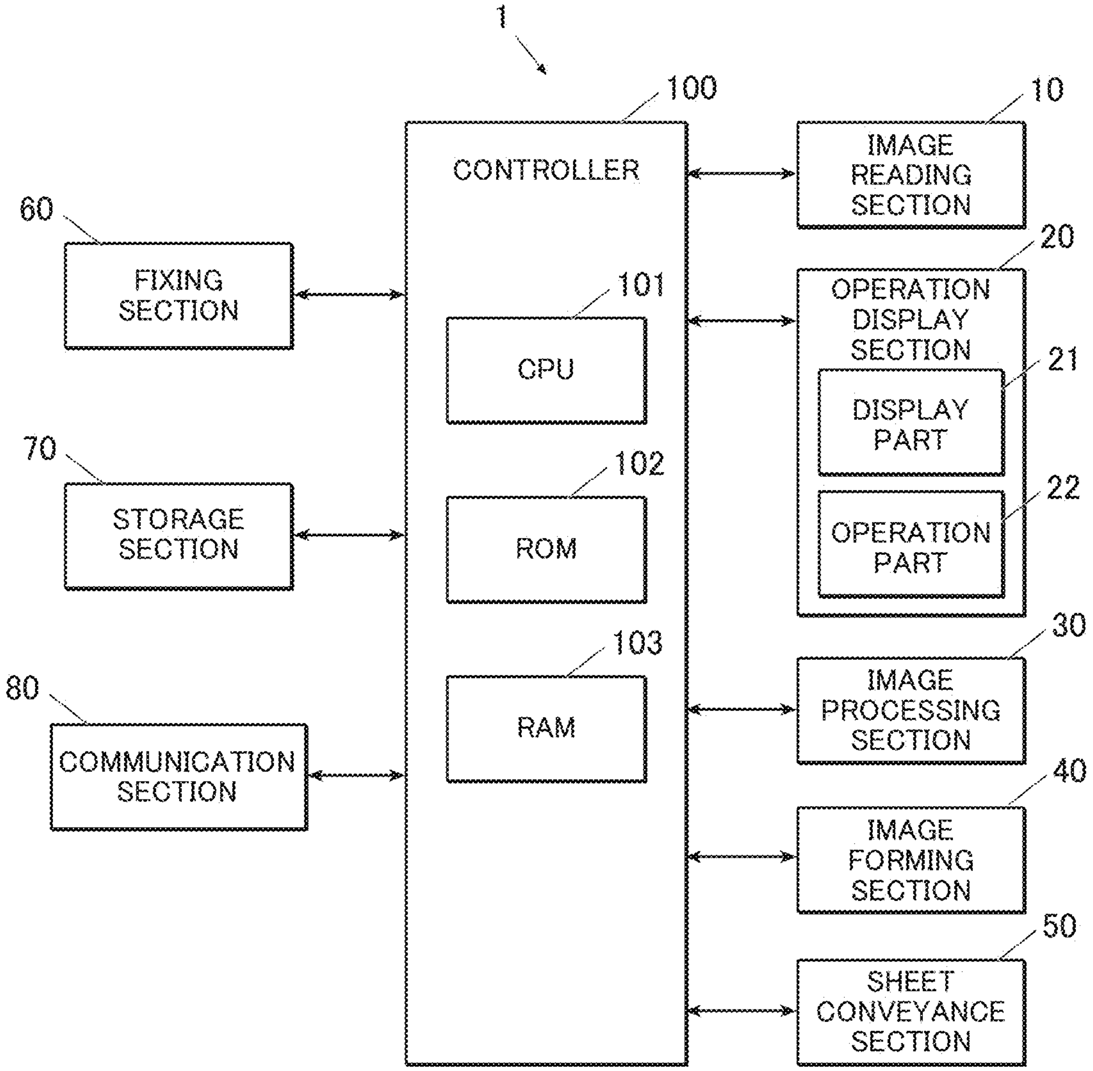
FIG. 2 is a block diagram illustrating a functional configuration of the image forming apparatus according to the first embodiment.

FIG. 1 is a view schematically illustrating an overall configuration of an image forming apparatus 1 according to an embodiment of the present invention. FIG. 2 shows a block diagram that indicates a main functional configuration of the image forming apparatus 1 according to the embodiment.

An image forming apparatus 1 illustrated in FIGS. 1 and 2 is a color image forming apparatus of an intermediate transfer method using an electrophotographic process technology. The image forming apparatus 1 transfers (primary transfer) toner images of respective colors of Y (yellow), M (magenta), C (cyan), and K (black) formed on the photosensitive drums 413 to the intermediate transfer belt 421. Next, the image forming apparatus 1 superimposes the toner images in four colors on the intermediate transfer belt 421, and then transfers the toner images onto a sheet S (secondary transfer), thereby forming an image.

The image forming apparatus 1 is of a tandem type in which photosensitive drums 413 corresponding to four colors of YMCK are arranged in series in a traveling direction of an intermediate transfer belt 421, and toner images of the respective colors are sequentially transferred to the intermediate transfer belt 421.

As illustrated in FIG. 2, the image forming apparatus 1 includes an image reading section 10, an operation display section 20, an image processing section 30, an image forming section 40, a sheet conveyance section 50, a fixing section 60, a storage section 70, a communication section 80, and a controller 100 (i.e., hardware processor).

The controller 100 includes a Central Processing section CPU 101, a read only memory (ROM) 102, a random access memory (RAM) 103, and the like.

The CPU 101 reads a program corresponding to the processing content from the ROM 102, develops the program in the RAM 103, and centrally controls the operation of each block of the image forming apparatus 1 illustrated in FIG. 2 in cooperation with the developed program.

The image reading section 10 includes an automatic document feeder (ADF) 11, a document image scanning device 12 (scanner), and the like.

The automatic document feeder 11 conveys a document D placed on a document tray by a conveyance mechanism and sends the document D to the document image scanner 12. The automatic document feeder 11 can continuously read images of a large number of documents D placed on a document tray at once.

The document image scanning device 12 optically scans a document conveyed from the automatic document feeder 11 onto a contact glass or a document placed on the contact glass. Next, the document image scanning device 12 reads a document image by forming an image of light reflected from the document on a light receiving surface of a charge-coupled device (CCD) sensor 12*a*. The image reading section 10 generates input image data based on a result of reading by the document image scanning device 12. The image processing section 30 performs predetermined image processing on the input image data.

The operation display section 20 includes, for example, a liquid crystal display (LCD) with a touch screen. The operation display section 20 functions as the display part 21 and the operation part 22.

The display part 21 displays various kinds of operation screens, a state of an image, operating situations of the respective functions, and the like in accordance with display control signals received from the controller 100.

The operation part 22 includes various kinds of operation keys such as a numeric keypad and a start key, accepts various kinds of input operation by a user, and outputs an operation signal to the controller 100.

The image processing section 30 includes a circuit and the like that applies digital image processing to image data of an input job (input image data) in accordance with initial settings or user settings. For example, the image processing section 30 applies tone correction on the basis of tone correction data under the control of the controller 100. The image processing section 30 applies, to the input image data, not only the tone correction but also various kinds of correction processing such as color correction and shading correction, compression processing, and the like.

The image forming section 40 forms an image with color toners of a Y component, an M component, a C component, and a K component on the basis of the input image data subjected to the image processing by the image processing section 30.

The image forming section 40 includes image forming units 41Y, 41M, 41C, and 41K, an intermediate transfer unit 42, and the like.

The image forming units 41Y, 41M, 41C, and 41K for the Y component, the M component, the C component, and the K component have a similar configuration. For convenience of illustration and description, common constitute elements are denoted by the same reference numerals, and when they are distinguished from each other, Y, M, C, or K is added to the reference numerals. In FIG. 1, reference signs are representatively provided to the constituent elements of the image forming unit 41Y for the Y constituent elements and the reference signs of the constituent elements of the other image forming units 41M, 41C, 41K are omitted.

The image forming unit 41 includes an exposure device 411, a developing device 412, a photosensitive drum 413, a charging device 414, a drum cleaning device 415, and the like.

The photosensitive drum 413 is, for example, an organic photoreceptor in which a photosensitive layer that is a resin containing an organic photoconductor is formed on an outer peripheral surface of a drum-shaped metal substrate. The photosensitive drum 413 functions as a latent image carrier.

The controller 100 controls drive current supplied to a drive motor (not illustrated) that rotates the photosensitive drum 413, thereby rotating the photosensitive drum 413 at a constant circumferential velocity.

The charging device 414 is, for example, an electrostatic charger, and uniformly charges the surface of the photoconductive photosensitive drum 413 to a negative polarity by generating corona discharge.

The exposure device 411 includes, for example, a semiconductor laser and irradiates the photosensitive drum 413 with laser light corresponding to the image in each color component. Thus, the exposure device 411 forms an electrostatic latent image of each color component in an image region of the surface of the photosensitive drum 413 irradiated with the laser light, due to a potential difference from a background region.

The developing device 412 is a developing device of a two-component development method, and forms a toner image by visualizing the electrostatic latent image by causing toner of each of the color components to adhere to the surface of the photosensitive drum 413. Details will be described later.

The drum cleaning device 415 includes a drum cleaning blade that comes in sliding contact with the surface of the photosensitive drum 413. The drum cleaning device 415 removes transfer residual toner remaining on the surface of the photosensitive drum 413 after the primary transfer.

The intermediate transfer unit 42 includes an intermediate transfer belt 421, a primary transfer roller 422, a plurality of support rollers 423, a secondary transfer roller 424, and a belt cleaning device 426.

The intermediate transfer belt 421 is an endless belt and stretched in a loop around the plurality of support rollers 423. At least one of the plurality of support rollers 423 is a drive roller, and the others are driven rollers. For example, preferably, a roller 423A arranged more on a downstream in a belt travel direction than a primary transfer roller 422 for the K component is a drive roller. Thus, the running speed of the belt at a primary transfer section is easily kept constant. The rotation of the roller 423A causes the intermediate transfer belt 421 to run in an arrow direction A at a constant speed.

The primary transfer roller 422 is arranged on an inner peripheral surface side of the intermediate transfer belt 421 in a manner facing the photosensitive drum 413 of each color component.

The intermediate transfer unit 42 presses the primary transfer roller 422 against the photosensitive drum 413 with the intermediate transfer belt 421 interposed therebetween. Thus, the intermediate transfer unit 42 forms a primary transfer nip for transferring the toner image from the photosensitive drum 413 to the intermediate transfer belt 421.

The secondary transfer roller 424 is disposed on the outer peripheral surface side of the intermediate transfer belt 421 so as to face the backup roller 423A disposed on the downstream side of the roller 423B in the belt traveling direction.

The intermediate transfer unit 42 presses the secondary transfer roller 424 against the backup roller 423B with the intermediate transfer belt 421 in between. Thus, the intermediate transfer unit 42 forms a secondary transfer nip for transferring the toner image onto the sheet S from the intermediate transfer belt 421.

The intermediate transfer unit 42 primarily transfers the toner images on the photosensitive drums 413 sequentially in a superimposed manner onto the intermediate transfer belt 421 when the intermediate transfer belt 421 passes through the primary transfer nips. Specifically, the intermediate transfer unit 42 applies a primary transfer bias to the primary transfer roller 422 and applies a charge having a polarity opposite to that of the toner to the side of the intermediate transfer belt 421 that is in contact with the primary transfer roller 422. Thus, the intermediate transfer unit 42 electrostatically transfers the toner image onto the intermediate transfer belt 421.

Thereafter, when the sheet S passes through the secondary transfer nip, the intermediate transfer unit 42 secondarily transfers the toner images on the intermediate transfer belt 421 to the sheet S. Specifically, the intermediate transfer unit 42 applies a secondary transfer bias to the secondary transfer roller 424, and applies a charge having a polarity opposite to that of the toner to the side of the sheet S that comes into contact with the secondary transfer roller 424. Thus, the intermediate transfer unit 42 electrostatically transfers the toner image onto the sheet S. The sheet conveyance section 50 conveys the sheet S having the toner image transferred thereon toward the fixing section 60.

The belt cleaning device 426 includes a belt cleaning blade and the like that comes into sliding contact with the surface of the intermediate transfer belt 421. The belt cleaning device 426 removes transfer residual toner remaining on the surface of the intermediate transfer belt 421 after the secondary transfer.

Instead of the secondary transfer roller 424, the intermediate transfer unit 42 may have a configuration in which a secondary transfer belt is stretched in a loop shape around a plurality of support rollers including a secondary transfer roller. The above-described configuration is a so-called belt-type secondary transfer unit.

The fixing section 60 applies heating and pressurizing to the conveyed sheet S on which the toner images have been secondarily transferred, thereby fixing the toner images on the sheet S.

The sheet conveyance section 50 includes a sheet feeding section 51, a sheet ejection section 52, and a conveyance path section 53.

Three sheet feeding tray sections 51*a* to 51*c* included in the sheet feeding section 51 accommodate sheets S (standard sheets, special sheets) identified based on basis weight, size, and the like for each type set in advance.

The conveyance path section 53 includes a plurality of conveyance roller pairs such as a registration roller pair 53*a*.

The sheet conveyance section 50 feeds the sheets S contained in the sheet feed tray sections 51*a* to 51*c* one by one from the top and conveys them to the image forming section 40 by the conveyance path section 53. At this time, a registration roller section in which a registration roller pair 53*a* is arranged corrects an inclination of the fed sheet S and adjusts a conveyance timing. Next, the image forming section 40 collectively secondarily transfers the toner images on the intermediate transfer belt 421 to one surface side of the sheet S. Next, the fixing section 60 fixes the secondarily transferred toner image onto the sheet. Next, the sheet conveyance section 50 ejects the sheet S carrying a formed image to the outside of the apparatus by the sheet ejection section 52 having a sheet ejection roller 52*a*.

The storage section 70 includes, for example, a nonvolatile semiconductor memory and a hard disk drive. The storage section 70 stores various types of data such as various types of setting information related to the image forming apparatus 1.

The communication section 80 includes a communication control card such as a local area network (LAN) card. The communication section 80 exchanges various kinds of data with an external device (e.g., a personal computer) connected to a communication network such as a LAN or a wide area network (WAN).

<2. Configuration of Developing Device 412>

Figure 3:
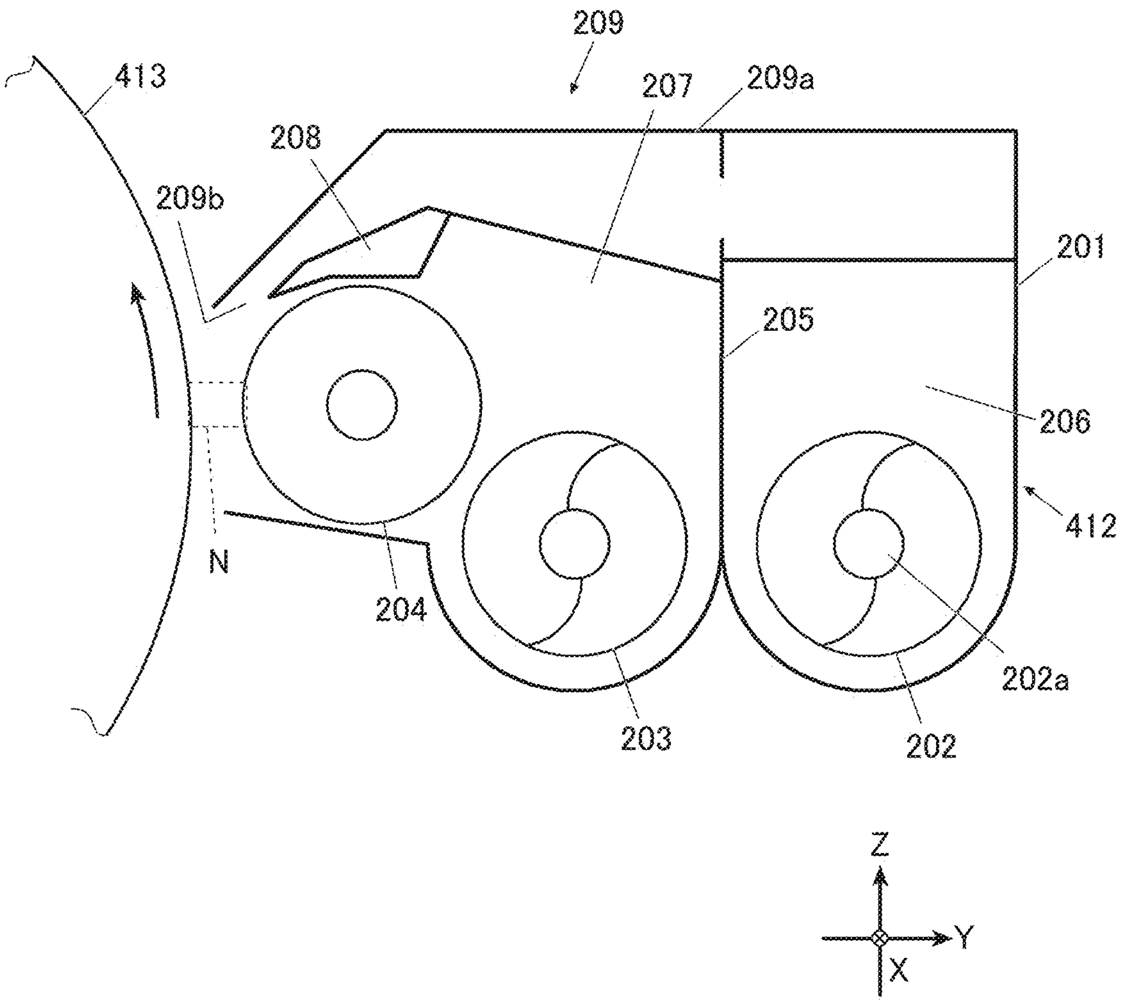
FIG. 3 is a schematic diagram of the vicinity of the developing device according to the first embodiment as viewed from the side.
Figure 4:
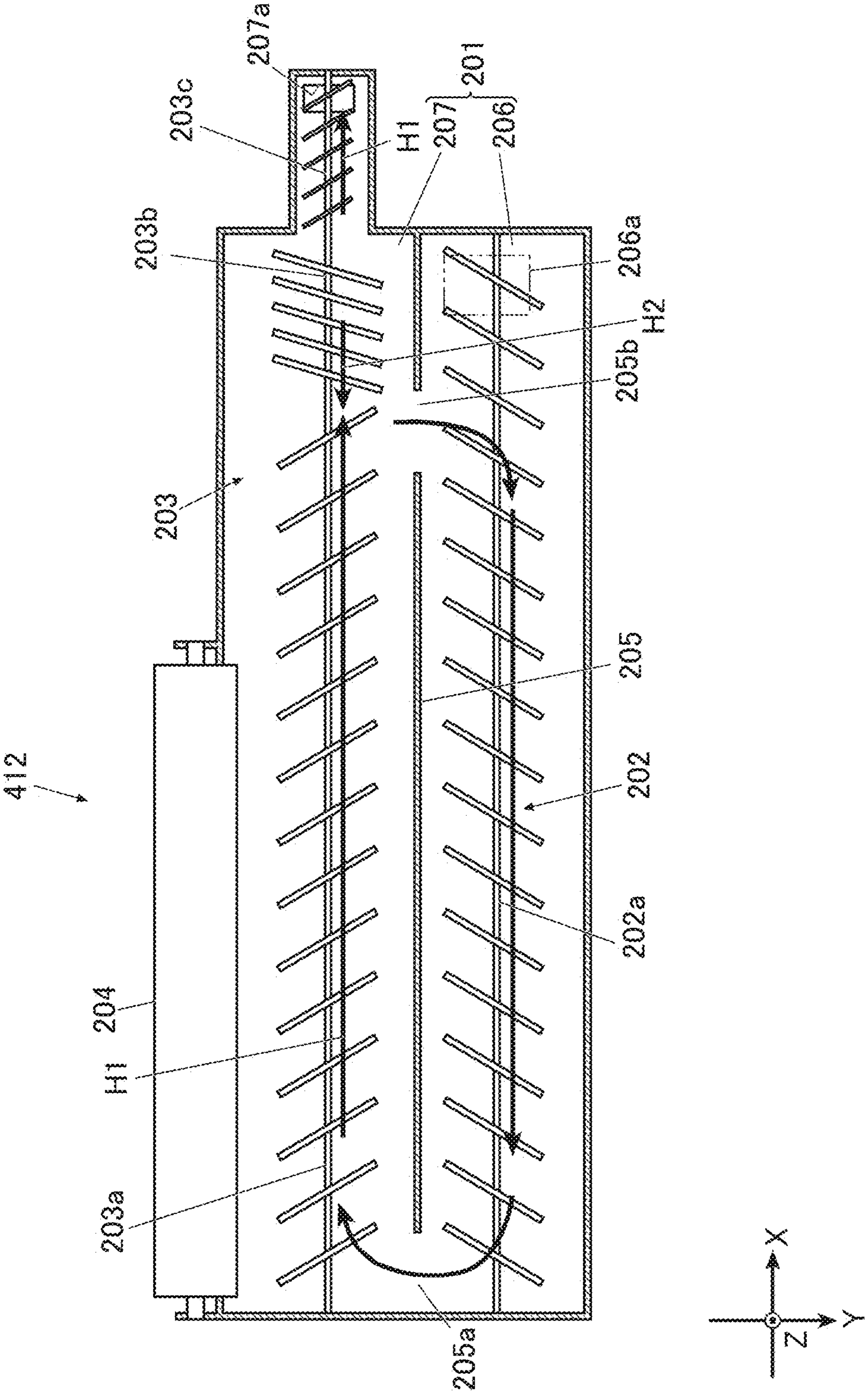
FIG. 4 is a schematic diagram of the vicinity of the developing device according to the first embodiment when viewed from above.

Next, the configuration of the developing device 412 will be described in detail with reference to FIGS. 3 and 4. FIG. 3 is a schematic side view of the vicinity of the developing device 412. FIG. 4 is a schematic diagram of the vicinity of the developing device 412 as viewed from above.

The developing device 412 is of a two component developing type, and develops an electrostatic latent image formed on the photosensitive drum 413 using a two component developer containing a toner and a carrier. Thus, the developing device 412 forms a toner image on the photosensitive drum 413.

The developing device 412 includes a developer housing 201.

The developer housing 201 stores developer containing toner and carrier. The developer housing 201 includes a toner conveyor 202, a toner supplying member 203, and a developing roller 204 therein. The developing roller 204 functions as a toner carrier (toner bearing member).

In the example illustrated in FIGS. 3 and 4, a direction parallel to a rotation shaft 202*a* of the toner conveyor 202 is an X-axis direction, a direction horizontal and orthogonal to the X-axis direction is a Y-axis direction, and a vertical direction orthogonal to both the X-axis direction and the Y-axis direction is a Z-axis direction.

The toner conveyor 202 and the toner supplying member 203 are arranged along an axial direction of the developing roller 204. Each of the toner conveyor 202 and the toner supplying member 203 is a screw-shaped member including a central shaft and a blade body spirally formed around the central shaft.

The developer housing 201 includes an accommodation chamber 206 that accommodates the toner conveyor 202, and an accommodation chamber 207 that accommodates the toner supplying member 203. The accommodation chamber 206 and the accommodation chamber 207 are partitioned by a partition wall 205 disposed along the XZ plane.

The toner conveyor 202 and the toner supplying member 203 are arranged in parallel with the partition wall 205 interposed therebetween.

As illustrated in FIG. 4, the toner supplying member 203 includes a supplying screw 203*a*, a reverse winding screw 203*b*, and a discharge screw 203*c* that are coaxially arranged in this order.

The supplying screw 203*a* supplies developer to the developing roller 204.

In the following description, a direction in which developer is conveyed by normal rotation of the supplying screw 203*a* is referred to as a "first conveyance direction H1", and a direction opposite thereto is referred to as a "second conveyance direction H2".

The reverse winding screw 203*b* is provided on the positive side of the X-axis direction of the supplying screw 203*a*, and conveys the developer in a direction opposite to the supplying screw 203*a*.

The discharge screw 203*c* is provided on the X-axis positive direction side of the reversely wound screw 203*b*.

The supplying screw 203*a* conveys the developer in a first conveyance direction H1 during its normal rotation. The reverse-winding screw 203*b* conveys the developer in a second conveyance direction H2 during its normal rotation. The discharge screw 203*c* conveys, during its normal rotation, the developer in the first conveyance direction H1 equal to the supplying screw 203*a*. Thus, the developer conveyed by the normal rotation of the supplying screw 203*a* is hardly conveyed to the positive side in the X-axis direction relative to the 203*b* of the reverse-winding screw. In this case, the developer conveyed during the normal rotation of the supplying screw 203*a* does not advance to the side of the 203*b* of the reversely wound screw; but is conveyed to the side of the toner conveyor 202 by bending its path.

As illustrated in FIG. 4, the accommodation chamber 207 includes an ejection port 207*a* for discharging the developer at an end portion in the positive direction of the X-axis.

The ejection port 207*a* is open downward from an inner bottom section of the accommodation chamber 207. The developer ejected from the ejection port 207*a* drops and is stored in a waste developer storage section (not illustrated).

The toner conveyor 202 conveys the developer in a direction opposite to the supplying screw 203*a* by being rotationally driven in the normal rotation direction.

As shown in FIG. 4, the accommodation chamber 206 includes a replenishment port 206*a* for supplying the developer into the developer housing 201 at an end portion in the X-axis positive direction.

Above the replenishment port 206*a* of the developer housing 201, a supply section (not illustrated) is arranged which includes a developer storage section in which developer for supply is stored and a conveyance mechanism which conveys the developer for supply from the developer storage section. The replenishment developer is replenished to the accommodation chamber 206 from above through the replenishment port 206*a*. The supplied developer for supply joins the developer circulating through the annular circulation path in the developer housing 201, and is conveyed by the toner conveyor 202.

As illustrated in FIG. 4, the partition wall 205 has openings 205*a* and 205*b*.

The opening 205*a* delivers the developer from the toner conveyor 202 to the supplying screw 203*a*.

The opening 205*b* delivers the developer from the supplying screw 203*a* to the toner conveyor 202.

Thus, the developer circulates between the accommodation chamber 206 and the accommodation chamber 207. Some of the developer conveyed by the toner supplying member 203 is supplied to the developing roller 204, and the developer is magnetically attracted to the outer peripheral surface of the developing roller 204.

The image forming apparatus 1 replenishes the toner decreased by consumption at the time of image formation by replenishing the developer from the replenishment port 206*a*. At the same time, the image forming apparatus 1 ejects the developer through the ejection port 207*a*. Thus, the image forming apparatus 1 replaces the deteriorated carrier in the developer housing 201 with the new carrier to be supplied, thereby suppressing deterioration of the carrier circulating in the developer housing 201.

A rotation ratio between the toner supplying member 203 and the toner conveyor 202 during the normal rotation, the opening widths of the openings 205*a* and 205*b*, and the number of turns of the reverse winding screw 203*b* are set to values with which an amount of developer in the developer housing 201 can be maintained at a predetermined amount.

In the present embodiment, the number of rotations of the toner supplying member 203 is 466 rpm, and the number of rotations of the toner conveyor 202 is 491 rpm. A rotation number ratio between the toner supplying member 203 and the toner conveyor 202 is 0.95:1. In the present embodiment, the opening widths of the openings 205*a* and 205*b* are 32.5 mm, and the number of turns of the reverse winding screw 203*b* is 7.

The developing roller 204 faces the photosensitive drum 413 at an opening of the developer housing 201. For example, the developing roller 204 conveys the developer attracted on the outer peripheral surface thereof toward a developing nip (or developing region) N that is an opposed section to the photosensitive drum 413. The developing roller 204 supplies toner to the photosensitive drum 413 at the developing nip N.

The developing device 412 includes a preventer 208 provided on an upper side of the developing roller 204.

The preventer 208 is a member that suppresses smoke (scattered toner) due to the developer, which is generated during rotation of the developing roller 204.

A developing device 412 includes a suction section 209 for sucking scattered toner generated between a photosensitive drum 413 and a developing roller 204.

The suction section 209 includes a duct 209*a* disposed along an upper outer surface of the developer housing 201 and a fan (not illustrated). A suction port 209*b*, which is a distal end portion of the duct 209*a*, is installed at a position close to the developing roller 204 on the photosensitive drum 413. The fan included in the suction section 209 sucks air in the duct 209*a*. Thus, the scattered toner generated between the photosensitive drum 413 and the developing roller 204 is taken into the duct 209*a* from the suction port 209*b*. After being conveyed through the duct 209*a*, the scattered toner is collected in a collection tank (not shown).

The controller 100 controls start and stop of rotation of the fan included in the suction section 209, change in rotation speed of the fan, and the like.

In the suction section 209, there is a problem in that the toner is accumulated on the wall surface of the duct 209*a* or the like, and the accumulated toner spills onto the photosensitive drum 413 or the sheet, thus causing image defect in which the inside of the image forming apparatus 1 is contaminated or the image is made dirty.

In particular, in the vicinity of the suction port 209*b*, the laminar flow generated by the rotation of the developing roller 204 and the laminar flow generated by the rotation of the photosensitive drum 413 intersect with each other, and a spiral airflow is generated. Therefore, even if the speed of suction air in the suction section 209 is increased, toner cannot be completely sucked and collected in the vicinity of the suction port 209*b* and is likely to be deposited. The vicinity of the suction port 209*b* is, for example, a distal end portion (an end portion on the photosensitive drum 413 side) of the preventer 208.

In the present embodiment, the image forming apparatus 1 crushes the toner accumulated on the preventer 208 by applying vibration to the preventer 208. Next, the image forming apparatus 1 collects the crushed toner by suction using the suction section 209 or causes the crushed toner to adhere to the developing roller 204, thereby reducing the toner accumulated on the preventer 208. Thus, the image forming apparatus 1 suppresses image defect due to spillage of the deposited toner onto the photosensitive drum 413 or the sheet.

<3. Configuration of Drive Mechanism 210>

Figure 5A:
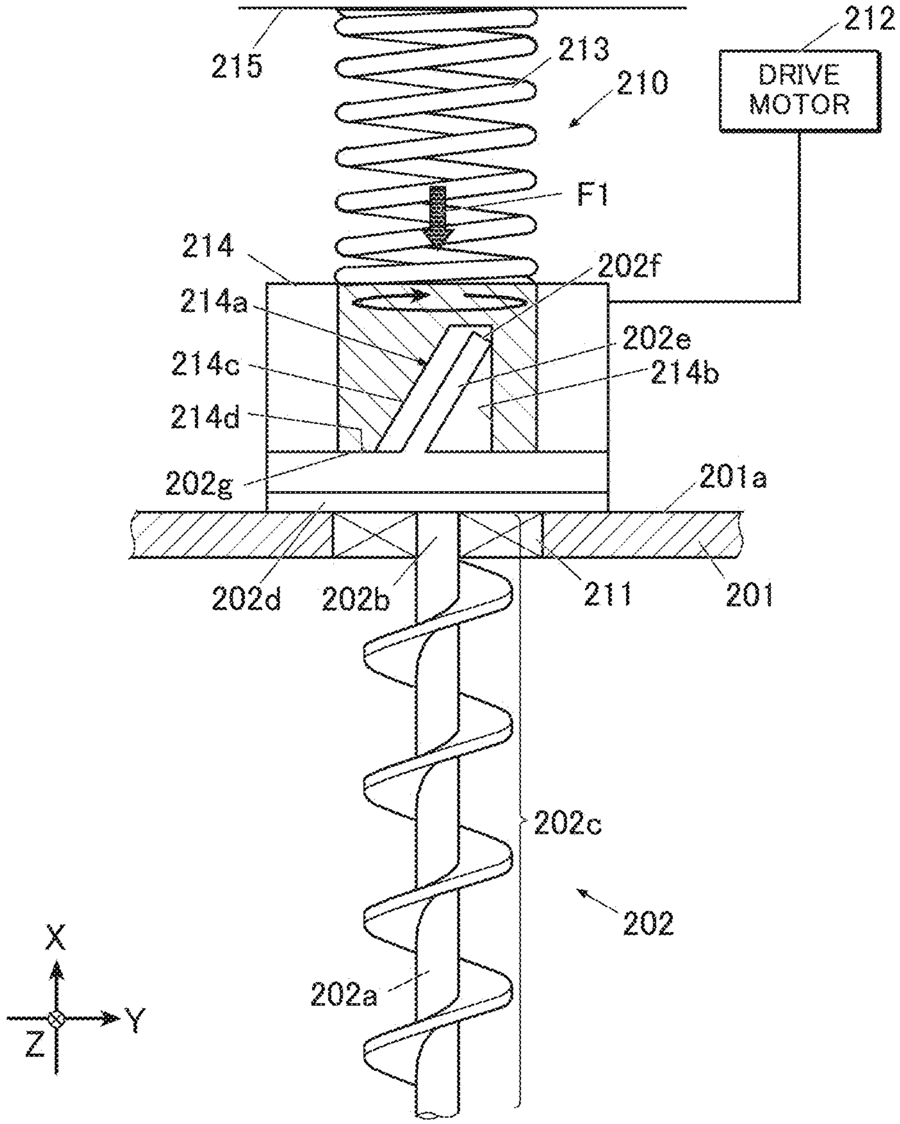
FIGS. 5A and 5B are schematic diagrams of the drive mechanism in a case where the drive transmitter rotates in a first direction.
Figure 5B:
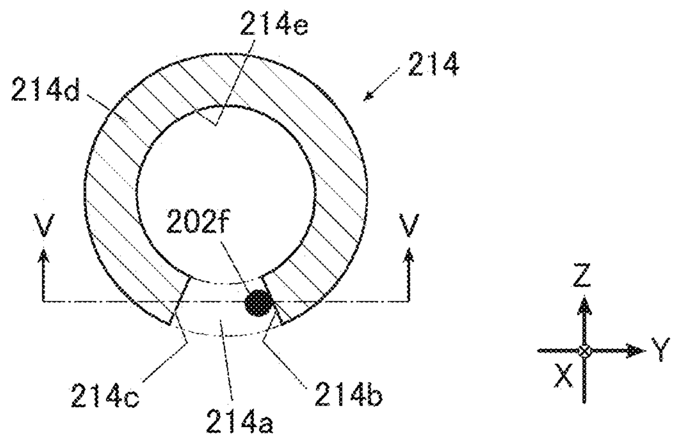

FIGS. 5A and 5B are schematic diagrams illustrating an example of the configuration of a drive mechanism 210 included in the developing device 412.

The drive mechanism 210 rotates the toner conveyor 202 about a rotation shaft 202*a* of the toner conveyor 202 to convey the developer stored in the accommodation chamber 206. An end portion 202*b* of the rotation shaft 202*a* on the positive side of the X-axis direction is rotatably supported by bearing 211 provided in the developer housing 201.

The drive mechanism 210 applies vibration to the preventer 208 to crush the toner accumulated on the preventer 208.

As illustrated in FIG. 5A, the toner conveyor 202 includes a screw member 202*c* disposed inside the developer housing 201 and an engagement member 202*d* disposed outside the developer housing 201. The screw member 202*c* and the engagement member 202*d* are integrally formed.

The engagement member 202*d* is disposed in contact with an outer wall surface 201*a* of the developer housing 201 at an end portion 202*b* of the rotation shaft 202*a*.

The engagement member 202*d* includes an engaging portion 202*e* that protrudes toward the positive side in the X-axis direction at a predetermined angle relative to the X-axis direction.

The drive mechanism 210 includes a drive motor 212, an elastic member 213, and a drive transmitter 214.

Figure 6:
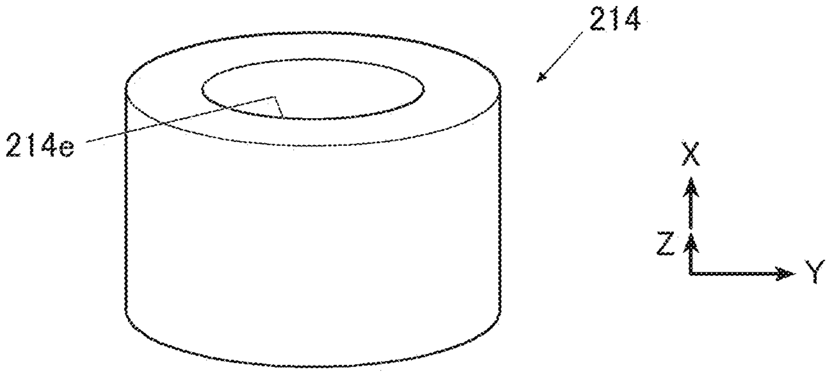
FIG. 6 is a schematic diagram of a drive transmitter.

The drive transmitter 214 is a substantially columnar member as shown in FIG. 6.

FIG. 5B is a schematic diagram illustrating a positional relationship between a drive transmitter 214 and an end portion 202*f* of an engaging portion 202*e* when viewed from an X-axis negative direction. The shaded section of the drive transmitter 214 illustrated in FIG. 5A is a cross-sectional view taken along line V-V illustrated in FIG. 5B.

Under the control of the controller 100, the drive motor 212 rotates the drive transmitter 214 about a rotation shaft parallel to the X-axis direction while switching between a first direction and a second direction. The first direction is a normal rotation direction and is counterclockwise when viewed from the X-axis negative direction side. The second direction is a reverse rotation direction and is clockwise when viewed from the X-axis negative direction side which is a direction opposite to the first direction.

The elastic member 213 is a spring or the like provided along the X-axis direction between an inner wall surface 215 of a housing of the image forming apparatus 1 and the drive transmitter 214. The elastic member 213 is extendable in the X-axis direction.

The drive transmitter 214 includes an engaged portion 214*a* which is engaged with the engaging portion 202*e* of the engagement member 202*d* on the opposing surface 214*d* opposing the engagement member 202*d*.

The engaged portion 214*a* has a substantially rectangular trapezoidal shape in the XY plane. The engaged portion 214*a* includes a parallel section 214*b* that is parallel to the X-axis and an inclined section 214*c* that is inclined at a predetermined angle with respect to the X-axis.

An angle at which the inclined section 214*c* inclines relative to the X-axis and an angle at which the engaging portion 202*e* of the engagement member 202*d* inclines relative to the X-axis are substantially the same, and the inclined section 214*c* and the engaging portion 202*e* are parallel to each other.

As shown in FIG. 6, the drive transmitter 214 has a through hole 214*e* at the center in the YZ plane. The through hole 214*e* penetrates the drive transmitter 214 in the X-axis direction. The rotation shaft 214*f* (see FIG. 14) of the drive transmitter 214 is inserted into the through hole 214*e*.

<4. Rotation Operation in First Direction>

Next, operations of the drive mechanism 210 and the toner conveyor 202 in a case where the drive transmitter 214 rotates in the first direction will be described.

In the state shown in FIG. 5A, the drive transmitter 214 is urged toward the engagement member 202*d* by the elastic force F1 of the elastic member 213. The engaging portion 202*e* of the engagement member 202*d* and the engaged portion 214*a* of the drive transmitter 214 are in an engaged state. The end portion 202*f* of the engaging portion 202*e* is in contact with the parallel section 214*b* of the engaged portion 214*a*. The opposing surface 214*d* of the drive transmitter 214 is in contact with an opposing surface 202*g* which is a surface of the engagement member 202*d* opposing the drive transmitter 214.

In this state, the controller 100 drives the drive motor 212 such that the drive transmitter 214 rotates in the first direction. The rotational driving force of the drive motor 212 is transmitted to the rotation shaft 202*a* of the toner conveyor 202 via the engaged portion 214*a* of the drive transmitter 214 and the engaging portion 202*e* of the engagement member 202*d* which are in the engaged state.

At this time, a conveying force with which the toner conveyor 202 conveys the developer by rotating in the first direction is greater than a load that the toner conveyor 202 receives from the developer stored in the accommodation chamber 206. Therefore, the toner conveyor 202 rotates in the first direction about the rotation shaft 202*a*. As a result, the toner conveyor 202 conveys the developer stored in the accommodation chamber 206 from the X-axis negative direction side to the X-axis positive direction side.

In the rotation operation in the first direction, the drive transmitter 214 and the toner conveyor 202 rotate in the first direction with the engaged portion 214*a* and the engaging portion 202*e* remaining engaged with each other.

As described above, in the rotation operation in the first direction, the drive transmitter 214 performs the first operation of transmitting the driving force for conveying the toner to the toner conveyor 202.

The controller 100 causes the drive transmitter 214 to rotate in the first direction in a state where the engaged portion 214*a* of the drive transmitter 214 and the engaging portion 202*e* of the toner conveyor 202 are engaged with each other. Thus, the controller 100 causes the drive transmitter 214 to, as a first operation, transmit a driving force greater than a rotation load of the toner conveyor 202 to the toner conveyor 202 to rotate the toner conveyor 202 in a first direction, thereby conveying toner.

The drive transmitter 214 transmits the driving force of the drive motor 212 to the toner conveyor 202 via the engaged portion 214*a* of the drive transmitter 214 and the engaging portion 202*e* of the engagement member 202*d* that are in the engaged state in the first operation.

<5. Rotation Operation in Second Direction>

Next, operations of the drive mechanism 210 and the toner conveyor 202 in a case where the drive transmitter 214 rotates in the second direction will be described.

FIGS. 7A to 12B are schematic diagrams illustrating an example of the configuration of the drive mechanism 210 in a case where the drive transmitter 214 rotates in the second direction.

The controller 100 drives the drive motor 212 such that the drive transmitter 214 rotates in the second direction in a state where the engaging portion 202*e* of the engagement member 202*d* and the engaged portion 214*a* of the drive transmitter 214 are engaged with each other.

Figure 7A:
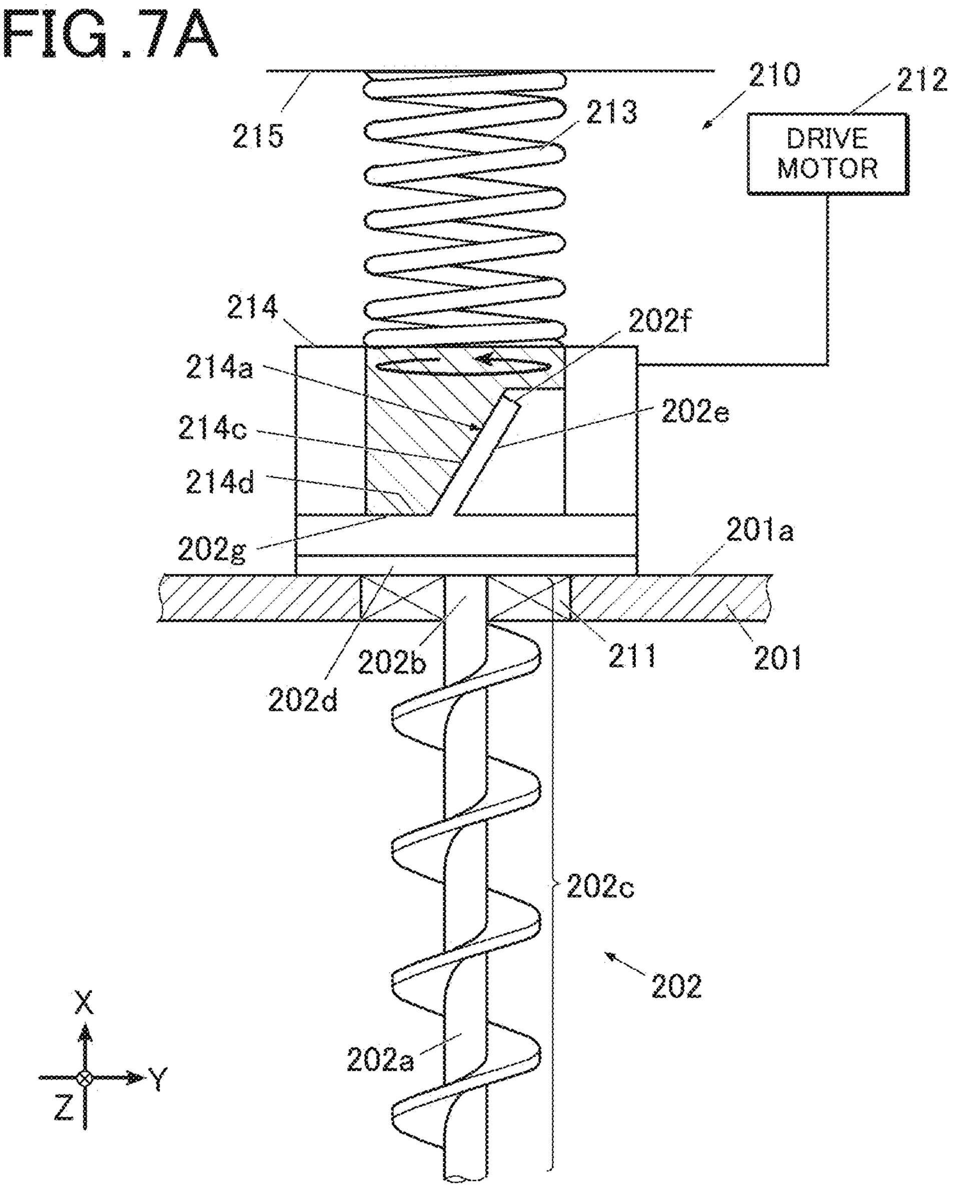
FIGS. 7A and 7B are schematic diagrams of the drive mechanism when the drive transmitter rotates in the second direction.

As the drive transmitter 214 rotates in the second direction, the engaging portion 202*e* contacts the inclined section 214*c* of the engaged portion 214*a*, as illustrated in FIG. 7A. A shaded section of the drive transmitter 214 illustrated in FIG. 7A is a cross-sectional view taken along a VIIA-VIIA line illustrated in FIG. 7B.

Figure 7B:
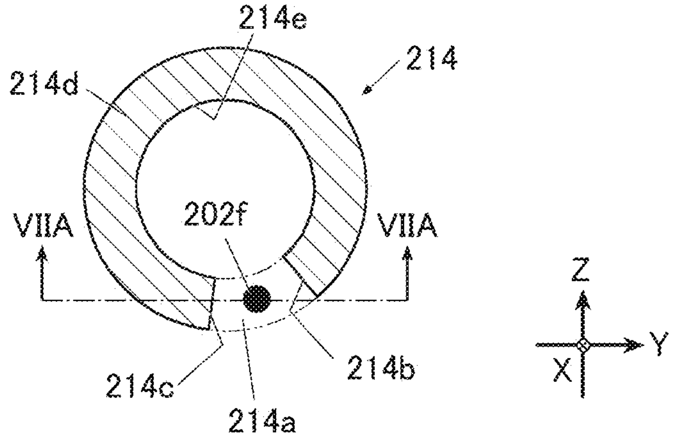
Figure 8A:
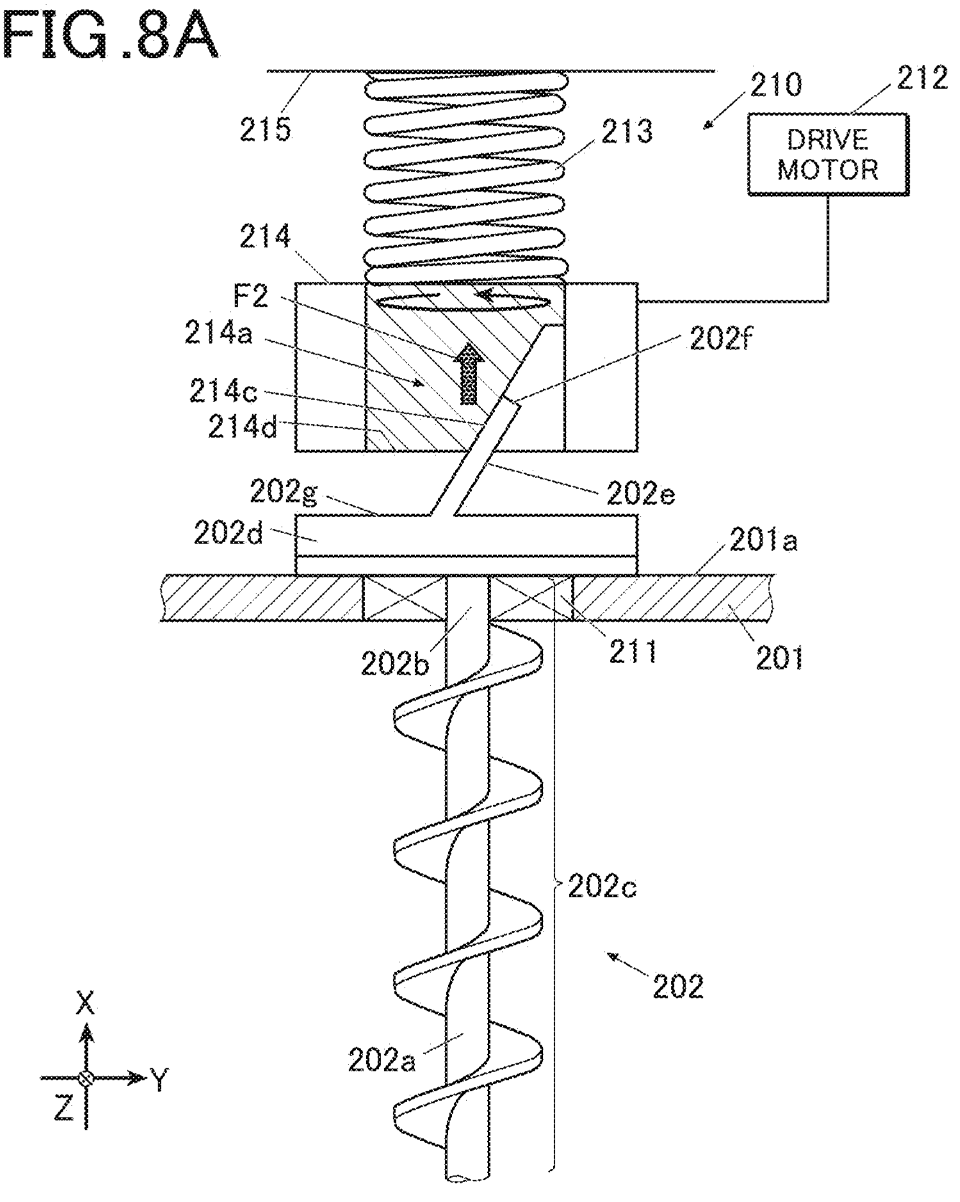
FIGS. 8A and 8B are schematic diagrams of the drive mechanism when the drive transmitter rotates in the second direction.
Figure 8B:
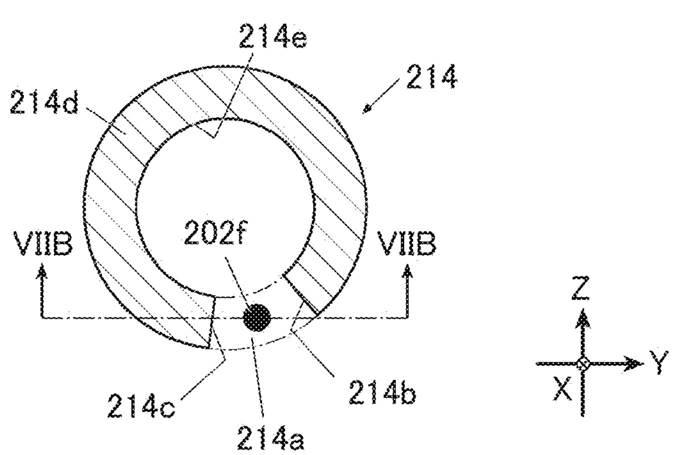

States in which the controller 100 has further rotated the drive transmitter 214 in the second direction from the states illustrated in FIGS. 7A and 7B are illustrated in FIGS. 8A and 8B, respectively. In the present embodiment, when the drive transmitter 214 rotates in the second direction, a load that the toner conveyor 202 receives from the developer stored in the accommodation chamber 206 is greater than a conveying force with which the toner conveyor 202 conveys the developer by rotating in the second direction. Therefore, the toner conveyor 202 does not rotate and remains stopped.

At this time, as illustrated in FIG. 8A, the engaged portion 214*a* receives force F2 from the engaging portion 202*e* at the inclined section 214*c*, A shaded section of the drive transmitter 214 illustrated in FIG. 8A is a cross-sectional view taken along a VIIB-VIIB line illustrated in FIG. 8B.

When the engaged portion 214*a* receives the force F2, the drive transmitter 214 moves to the X-axis positive direction side, and the facing surface 214*d* of the drive transmitter 214 and the facing surface 202*g* of the engagement member 202*d* are separated from each other. Thus, the elastic member 213 contracts in the X-axis direction.

Figure 9A:
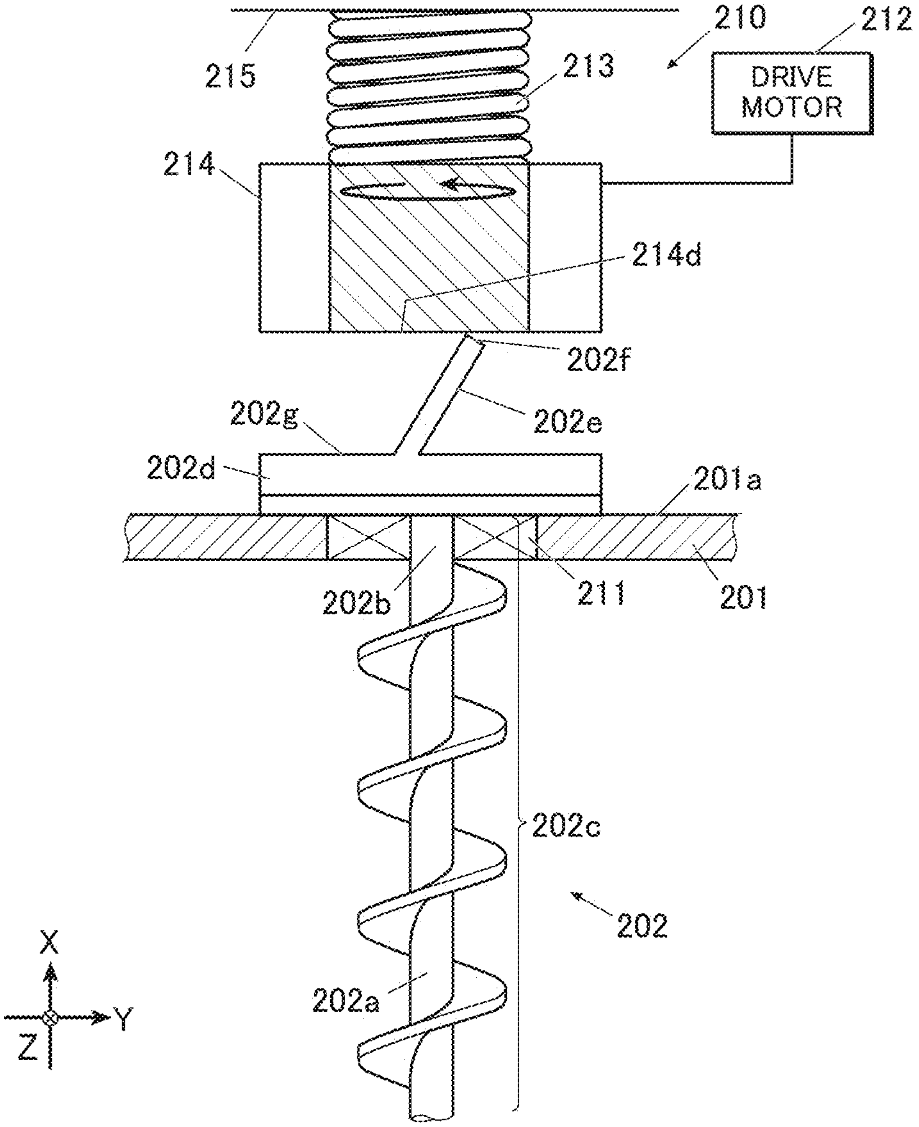
FIGS. 9A and 9B are schematic diagrams of the drive mechanism when the drive transmitter rotates in the second direction.
Figure 9B:
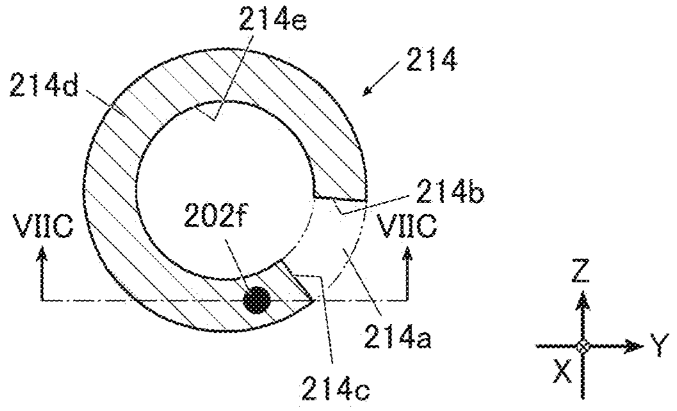

States in which the controller 100 has further rotated the drive transmitter 214 in the second direction from the states illustrated in FIGS. 8A and 8B are illustrated in FIGS. 9A and 9B, respectively. As shown in FIG. 9A, the drive transmitter 214 further moves in the positive X-axis direction. A shaded section of the drive transmitter 214 illustrated in FIG. 9A is a cross-sectional view taken along a VIIC-VIIC line illustrated in FIG. 9B.

When the drive transmitter 214 further moves in the positive X-axis direction, the engagement between the engaging portion 202*e* of the engagement member 202*d* and the engaged portion 214*a* of the drive transmitter 214 is released, and the end portion 202*f* of the engaging portion 202*e* abuts on the facing surface 214*d* of the drive transmitter 214. The elastic member 213 further contracts in the X-axis direction. The elastic member 213 illustrated in FIG. 9A is in a most contracted state.

Figure 10A:
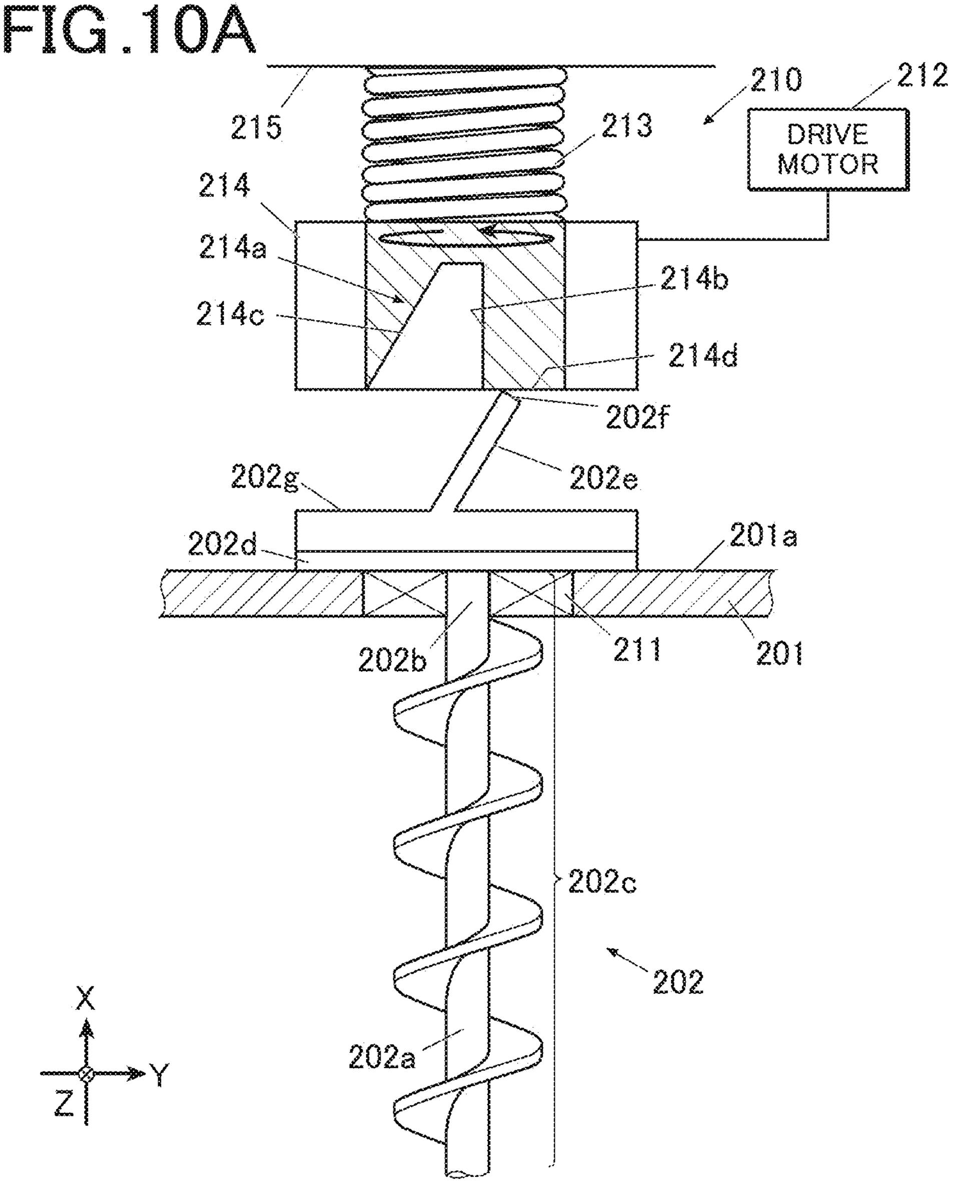
FIG. 10A and FIG. 10B are schematic diagrams of the drive mechanism when the drive transmitter rotates in the second direction.
Figure 10B:
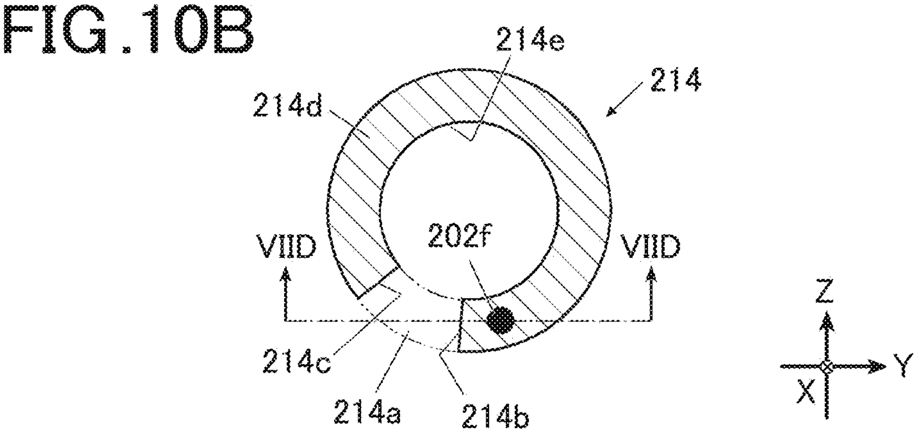

States in which the controller 100 has further rotated the drive transmitter 214 in the second direction from the states illustrated in FIGS. 9A and 9B are illustrated in FIGS. 10A and 10B, respectively. As illustrated in FIG. 10A, the end portion 202*f* of the engaging portion 202*e* is in contact with the facing surface 214*d* of the drive transmitter 214, and the drive transmitter 214 rotates in the second direction with the elastic member 213 remaining in the most contracted state. The shaded area of the drive transmitter 214 illustrated in FIG. 10A is a cross-sectional view taken along the VIID-VIID line illustrated in FIG. 10B.

Figure 11A:
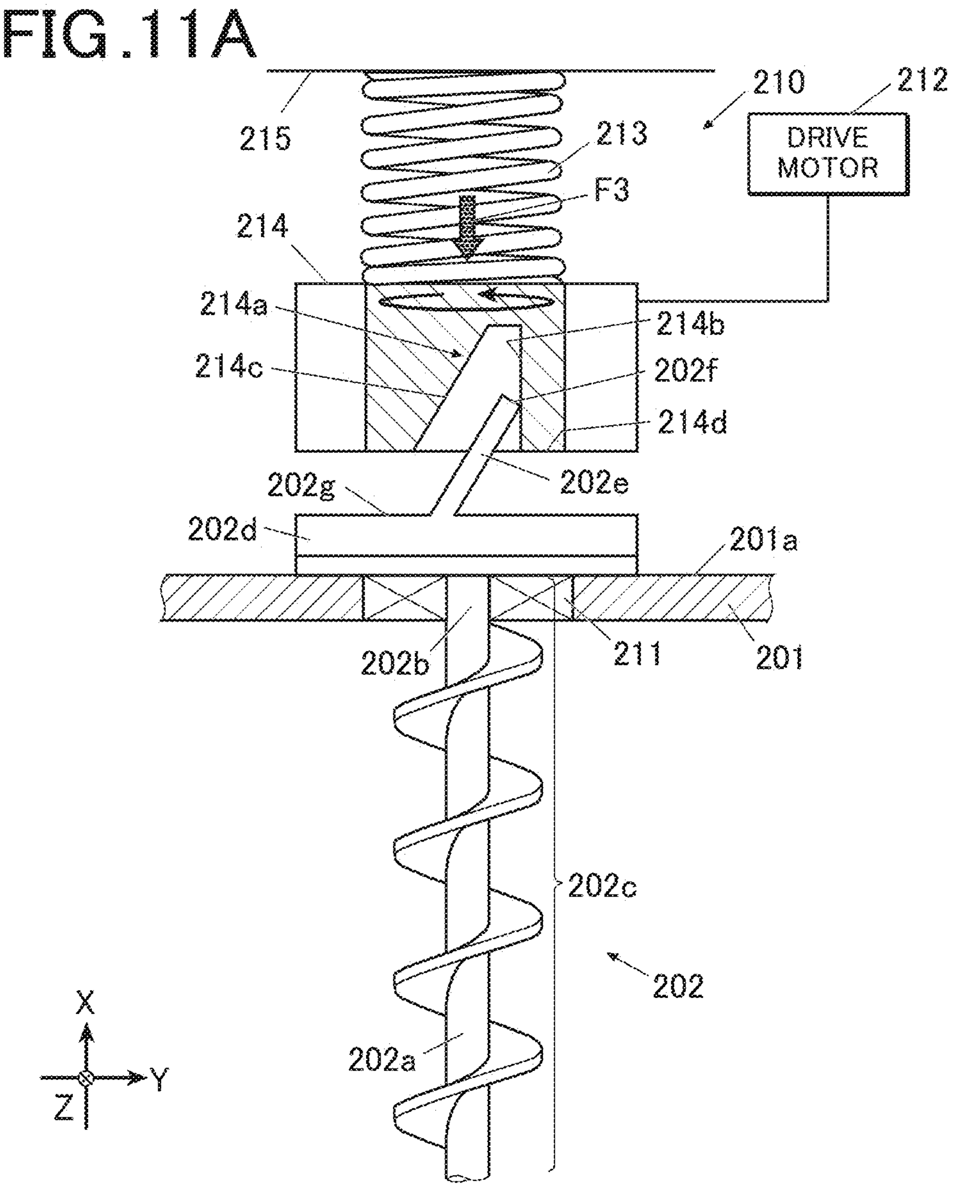
FIG. 11A and FIG. 11B are schematic diagrams of the drive mechanism when the drive transmitter rotates in the second direction.
Figure 11B:
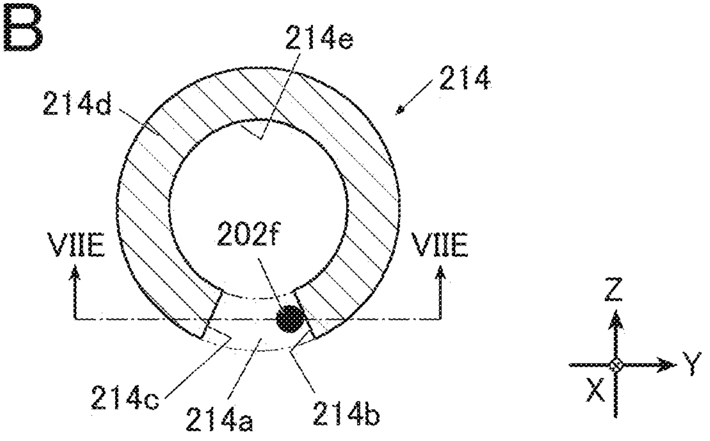

States in which the controller 100 has further rotated the drive transmitter 214 in the second direction from the states illustrated in FIGS. 10A and 10B are illustrated in FIGS. 11A and 11B, respectively. As illustrated in FIG. 11A, the end portion 202*f* of the engaging portion 202*e* reaches the position of the parallel section 214*b* of the engaged portion 214*a*, and the end portion 202*f* abuts on the parallel section 214*b*. The shaded area of the drive transmitter 214 illustrated in FIG. 11A is a cross-sectional view taken along the VIIE-VIIE line illustrated in FIG. 11B.

When the end portion 202*f* comes into contact with the parallel section 214*b*, the contraction of the elastic member 213 is released, and the drive transmitter 214 moves in the negative X-axis direction by the elastic repulsion force F3 of the elastic member 213.

Figure 12A:
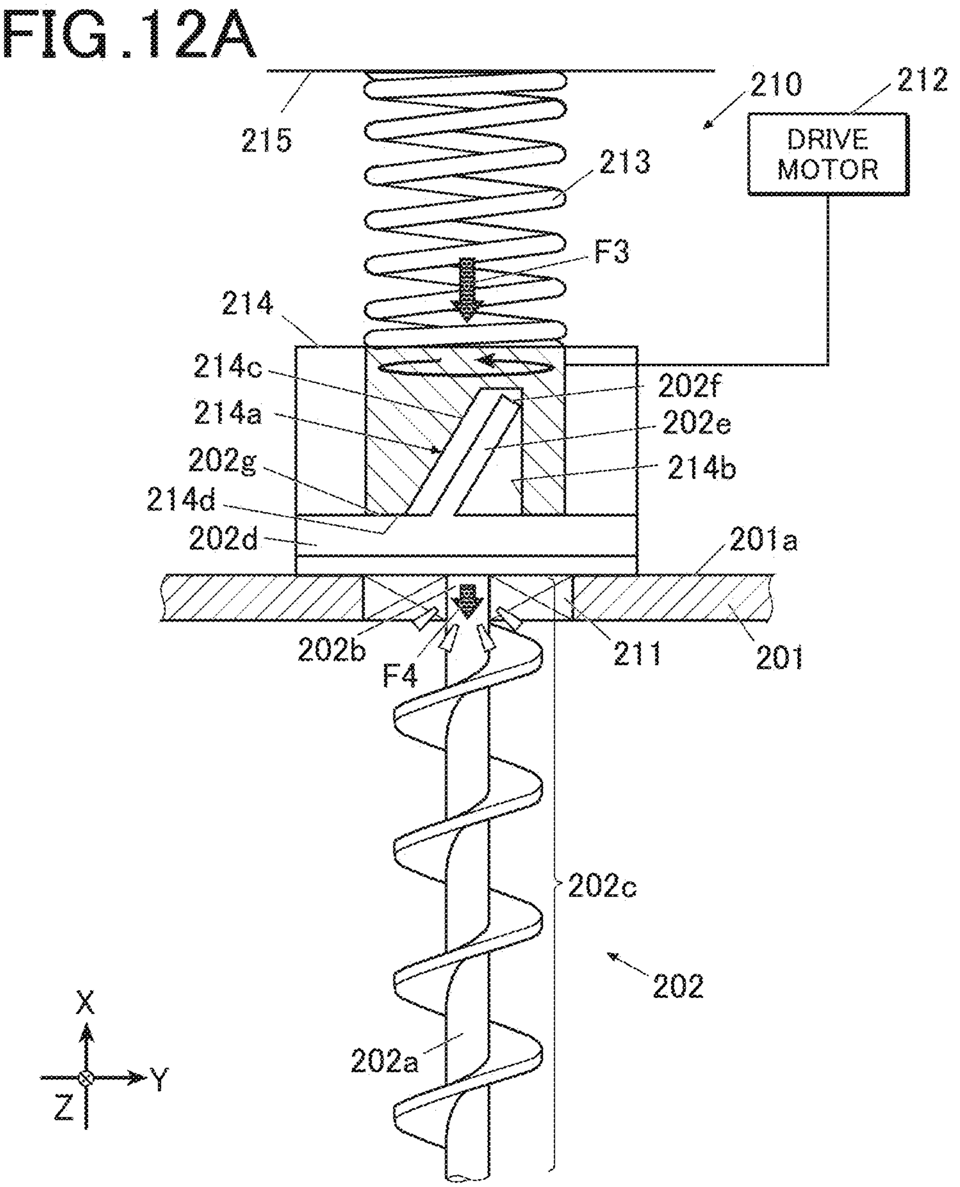
FIG. 12A and FIG. 12B are schematic diagrams of the drive mechanism when the drive transmitter rotates in the second direction.
Figure 12B:
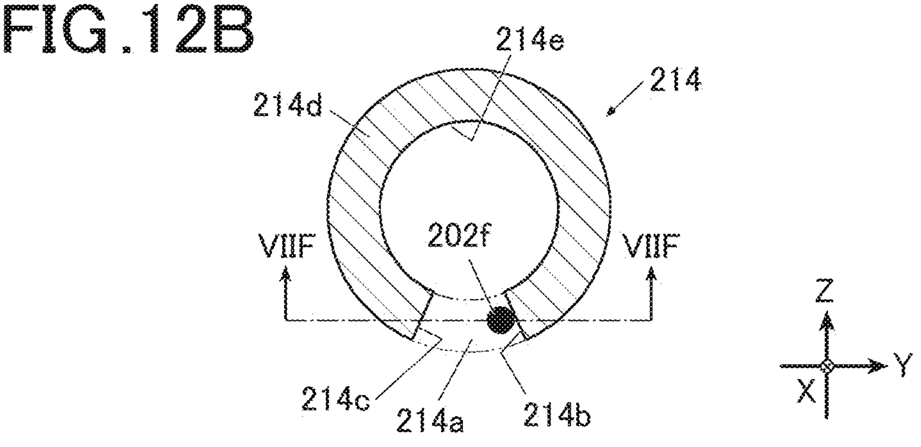

States in which the controller 100 has further rotated the drive transmitter 214 in the second direction from the states illustrated in FIGS. 11A and 11B are illustrated in FIGS. 12A and 12B, respectively. As illustrated in FIG. 12A, the engaging portion 202*e* of the engagement member 202*d* and the engaged portion 214*a* of the drive transmitter 214 are in an engaged state. The shaded area of the drive transmitter 214 illustrated in FIG. 12A is a cross-sectional view taken along the VIIF-VIIF line illustrated in FIG. 12B.

The drive transmitter 214 is further moved in the negative X-axis direction by the elastic repulsion F3 of the elastic member 213. The drive transmitter 214 collides, at the facing surface 214*d*, with the facing surface 202*g* of the engagement member 202*d*. That is, the elastic repulsion force F3 accumulated in the elastic member 213 is released in a short time, so that the drive transmitter 214 collides with the engagement member 202*d*.

As a result, the drive transmitter 214 applies an impact F4 to the screw member 202*c* of the toner conveyor 202. The vibration by the impact force F4 received by the screw member 202*c* is transmitted to the preventer 208 through the bearings 211 and the developer housing 201.

When the preventer 208 vibrates, the toner deposited on the preventer 208 is crushed, and the crushed toner is sucked and collected by the suction section 209. Alternatively, the crushed toner adheres to the developing roller 204.

When the controller 100 further rotates the drive transmitter 214 in the second direction from the state illustrated in FIG. 12A and FIG. 12B, the state returns to the state illustrated in FIG. 7A and FIG. 7B, respectively. In the states illustrated in FIG. 7A to FIG. 12B, the rotation of the toner conveyor 202 remains stopped.

The controller 100 causes the drive transmitter 214 to repeatedly collide with the engagement member 202*d* by continuing to rotate the drive transmitter 214 in the second direction.

As described above, in the rotational operation in the second direction, the drive transmitter 214 performs the second operation which is an operation of vibrating the preventer 208 for preventing scattering of the toner provided in the developing device 412.

The controller 100 causes the drive transmitter 214 to perform the second operation in a state where the drive transmitter 214 is rotated in the second direction and the rotation of the toner conveyor 202 is stopped.

The drive transmitter 214 is displaceable along the axial direction (X-axis direction) of the toner conveyor 202. The drive transmitter 214 performs the second operation when displaced from the position in the state where the engagement between the engaged portion 214*a* and the engaging portion 202*e* is released to the position in the state where the engaged portion 214*a* and the engaging portion 202*e* are engaged with each other.

In the rotation operation in the first direction and the rotation operation in the second direction, the drive transmitter 214 switches between the first operation and the second operation.

The controller 100 causes the drive transmitter 214 to switch between the first operation and the second operation by switching the rotation direction of the drive transmitter 214. The controller 100 functions as a first controller.

<6. Effect of Second Operation>

Figure 13:
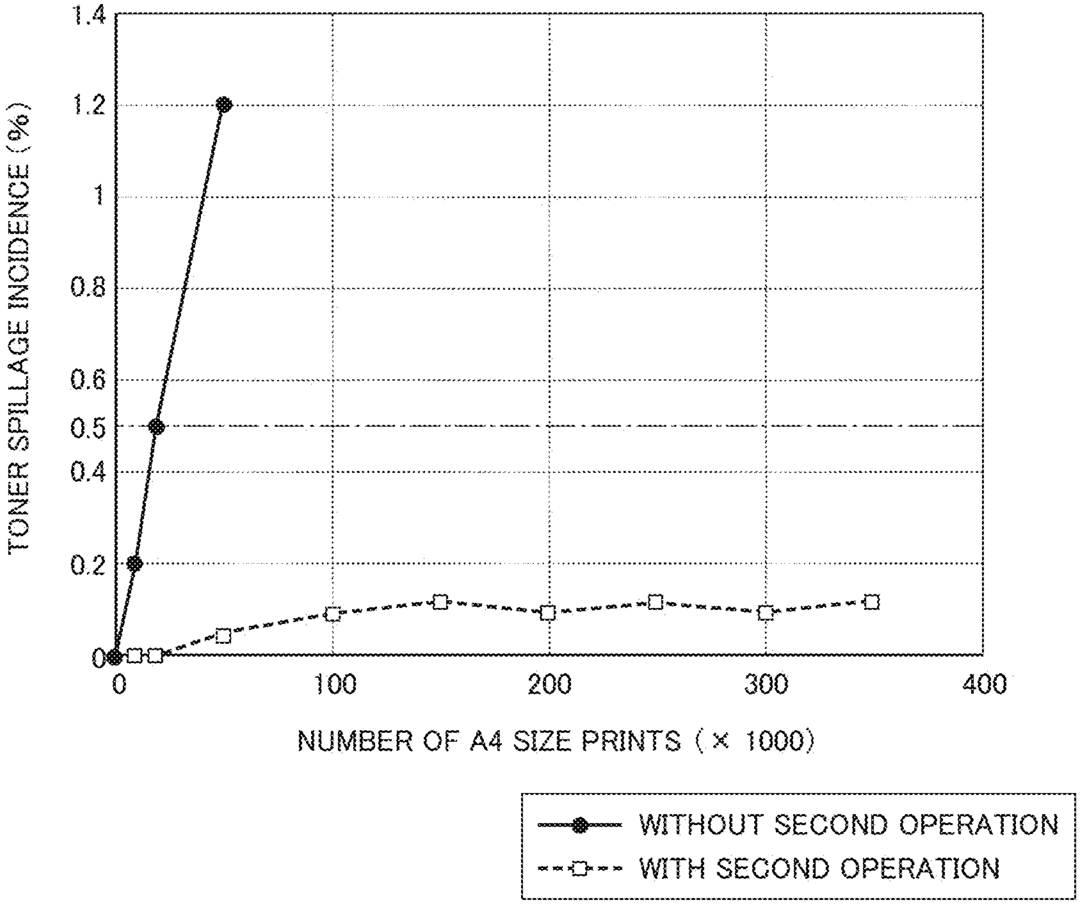
FIG. 13 is a diagram illustrating an effect by the second operation.

FIG. 13 illustrates an effect of suppressing image defect by the second operation.

The example shown in FIG. 13 is a result of the durability evaluation performed in the image forming apparatus 1.

The horizontal axis of FIG. 13 represents the number of A4 size sheets printed by the image forming apparatus 1. The vertical axis represents a toner spillage incidence that is a ratio of the number of sheets on which image dirt due to toner spillage occurs to the number of printed sheets. The solid line indicates the toner spillage incidence in a case where the second operation was not performed. The broken line indicates the toner spillage incidence in a case where the second operation was performed.

The temperature and humidity in the image forming apparatus 1 in the durability evaluation are 23° C. and 50%, respectively. The coverage of each color in the durability evaluation is 5%. In the durability evaluation, the image forming apparatus 1 performs continuous printing on A4 size sheets. In the durability evaluation, the number of sheets with image contamination due to toner spillage is counted every time 2,000 sheets are printed, and the toner spillage incidence is calculated. A target value of the toner spillage incidence in the durability evaluation is 0.5% or less, and a period of the durability evaluation is during printing of 350,000 sheets (developer life).

As illustrated in FIG. 13, in a case where the second operation was not performed (in a case without the second operation), the toner spillage incidence gradually increased as continuous printing was performed, and after printing 50,000 sheets, the toner spillage incidence was 1.2%, which did not reach the target.

On the other hand, when the second operation according to the present invention was performed every time 3,000 sheets were printed (with the second operation), the toner spillage incidence maintained the target value of 0.5% or less during the printing of the 350,000 sheets, verifying that the target could be achieved.

Second Embodiment

Next, an image forming apparatus 1 according to a second embodiment will be described.

In the following description, the same components as those of the image forming apparatus 1 according to the first embodiment are denoted by the same reference numerals, and the description thereof will be omitted.

In the first embodiment described above, when the drive transmitter 214 rotates in the second direction, the load that the toner conveyor 202 receives from the developer is greater than the conveying force with which the toner conveyor 202 conveys the developer by rotating in the second direction. Therefore, the toner conveyor 202 does not rotate and remains stopped.

In the second embodiment, it is assumed that, when the drive transmitter 214 rotates in the second direction, a load that the toner conveyor 202 receives from the developer is less than or equal to a conveying force with which the toner conveyor 202 conveys the developer by rotating in the second direction. In this case, the toner conveyor 202 rotates in a second direction, and the developer in the developer housing 201 is conveyed in a direction opposite to the direction illustrated in FIG. 4. At this time, the developer in the developer housing 201 is excessively ejected through the ejection port 207*a*. Thus, when the amount of developer in the developer housing 201 becomes smaller than a predetermined amount, the amount of developer to be supplied to the developing roller 204 becomes insufficient, resulting in image defect such as screw pitch unevenness. The screw pitch unevenness is density unevenness that occurs in a formed image.

Figure 14:
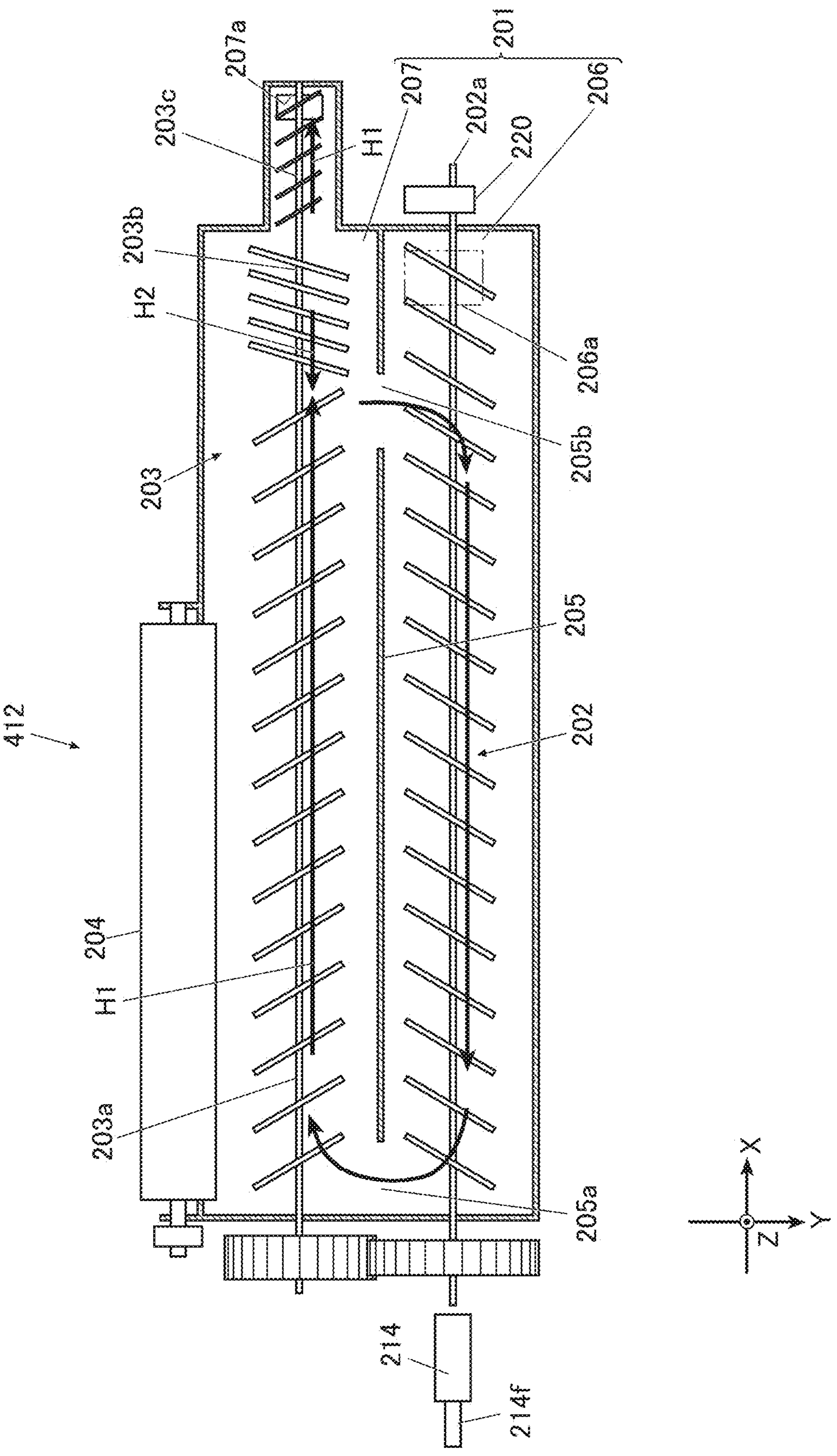
FIG. 14 is a schematic diagram illustrating the vicinity of the developing device according to the second embodiment when viewed from above.

In order to prevent the above-described image defect, the developing device 412 of the second embodiment includes a one way clutch 220 illustrated in FIG. 14. FIG. 14 is a schematic diagram of the vicinity of the developing device 412 of the second embodiment when viewed from above.

The one-way clutch 220 is provided on the rotation shaft 202*a* section of the toner conveyor 202 outside the developer housing 201 on the X-axis positive direction side which is opposite to the side on which the drive transmitter 214 is disposed.

When the drive transmitter 214 rotates in the first direction in the first operation, the one way clutch 220 does not restrict the toner conveyor 202 from rotating in the first direction. On the other hand, the one-way clutch 220 restricts the toner conveyor 202 from rotating in the second direction when the drive transmitter 214 rotates in the second direction in the second operation. The one way clutch 220 functions as a restricting member (restrictor).

Modification Example of Second Embodiment

Next, the image forming apparatus 1 relating to a modification example of the second embodiment will be described.

In the following description, the same components as those of the image forming apparatus 1 according to the first embodiment are denoted by the same reference numerals, and the description thereof will be omitted.

Figure 15:
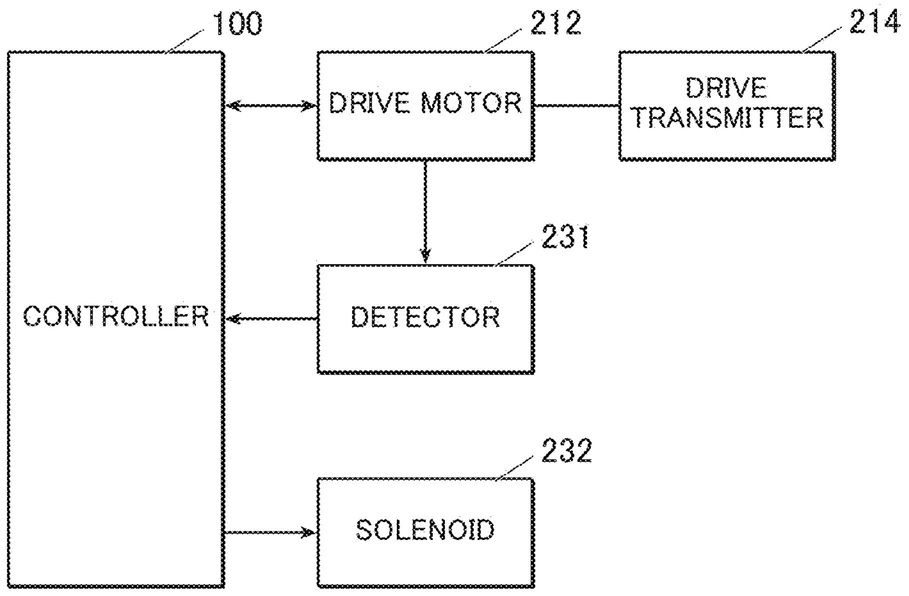
FIG. 15 is a block diagram illustrating a control function in the rotation restricting operation according to a modification example of the second embodiment.
Figure 16:
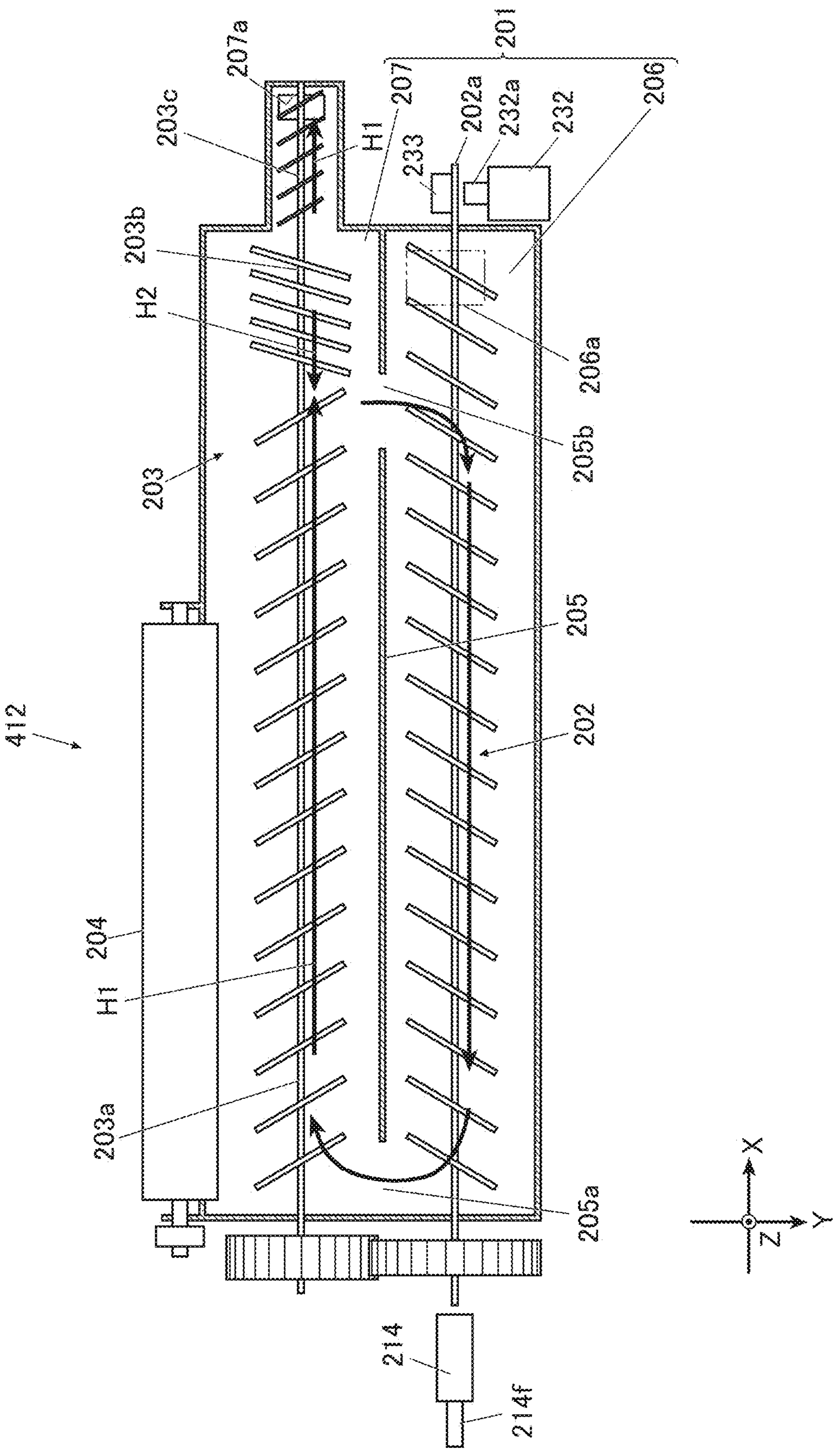
FIG. 16 is a schematic diagram illustrating the vicinity of the developing device according to a modification example of the second embodiment when viewed from above.

The image forming apparatus 1 of the present modification example includes a detector 231 and a solenoid 232 illustrated in FIG. 15, and a protrusion member 233 illustrated in FIG. 16, instead of the one-way clutch 220. FIG. 15 is a block diagram illustrating a control function in the rotation restricting operation of the toner conveyor 202 of the present modification example. FIG. 16 is a schematic diagram of the vicinity of the developing device 412 of the present modification example as viewed from above.

Figure 17:
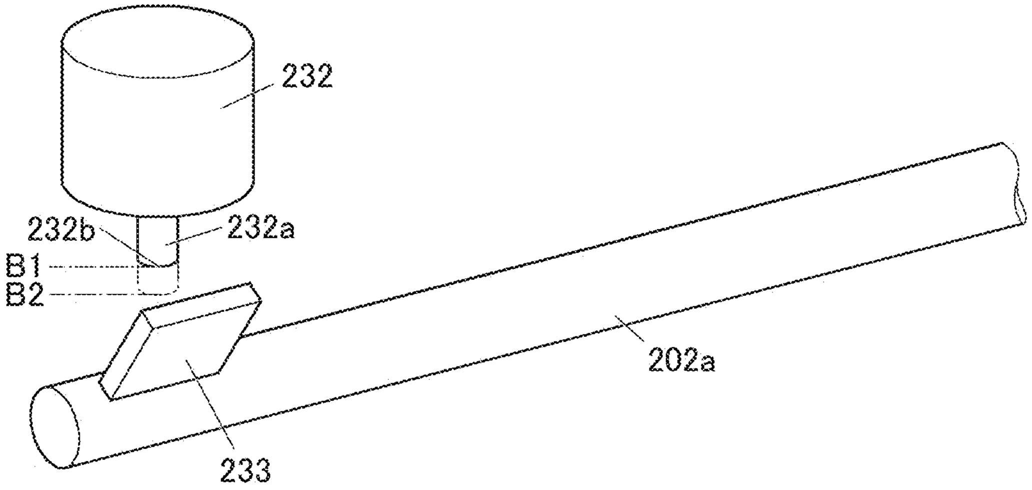
FIG. 17 is a schematic perspective view of the vicinity of a solenoid and a protrusion member according to a modification example of the second embodiment.

FIG. 17 is a schematic perspective view of the solenoid 232 and the vicinity of the protrusion member 233.

The detector 231 detects a load applied to the drive motor 212 to detect a rotation load of the toner conveyor 202 via the drive transmitter 214. The rotation load of the toner conveyor 202 is a load that the toner conveyor 202 receives from the developer stored in the accommodation chamber 206.

The detector 231 outputs the detected rotation load of the toner conveyor 202 to the controller 100.

The solenoid 232 and the protrusion member 233 are provided outside the developer housing 201 on the X-axis positive direction side which is the opposite side to the side on which the drive transmitter 214 is disposed.

The protrusion member 233 is a plate-shaped member provided on the rotation shaft 202*a* of the toner conveyor 202.

The solenoid 232 includes a movable section 232*a* that is displaceable in the Y-axis direction.

Under the control of the controller 100, the solenoid 232 displaces the movable section 232*a* such that the distal end portion 232*b* of the movable section 232*a* is located at the first position B1 or the second position B2.

As illustrated in FIG. 17, in a case where the distal end portion 232*b* of the movable section 232*a* is located at the first position B1, the distal end portion 232*b* and the protrusion member 233 do not interfere with each other even when the toner conveyor 202 rotates. Therefore, the toner conveyor 202 is rotatable. That is, the rotation of the toner conveyor 202 is not restricted.

On the other hand, when the distal end portion 232*b* of the movable section 232*a* is located at the second position B2, the distal end portion 232*b* and the protrusion member 233 interfere with each other even if the toner conveyor 202 attempts to rotate. Therefore, the toner conveyor 202 cannot rotate. That is, the rotation of the toner conveyor 202 is restricted.

Figure 18:
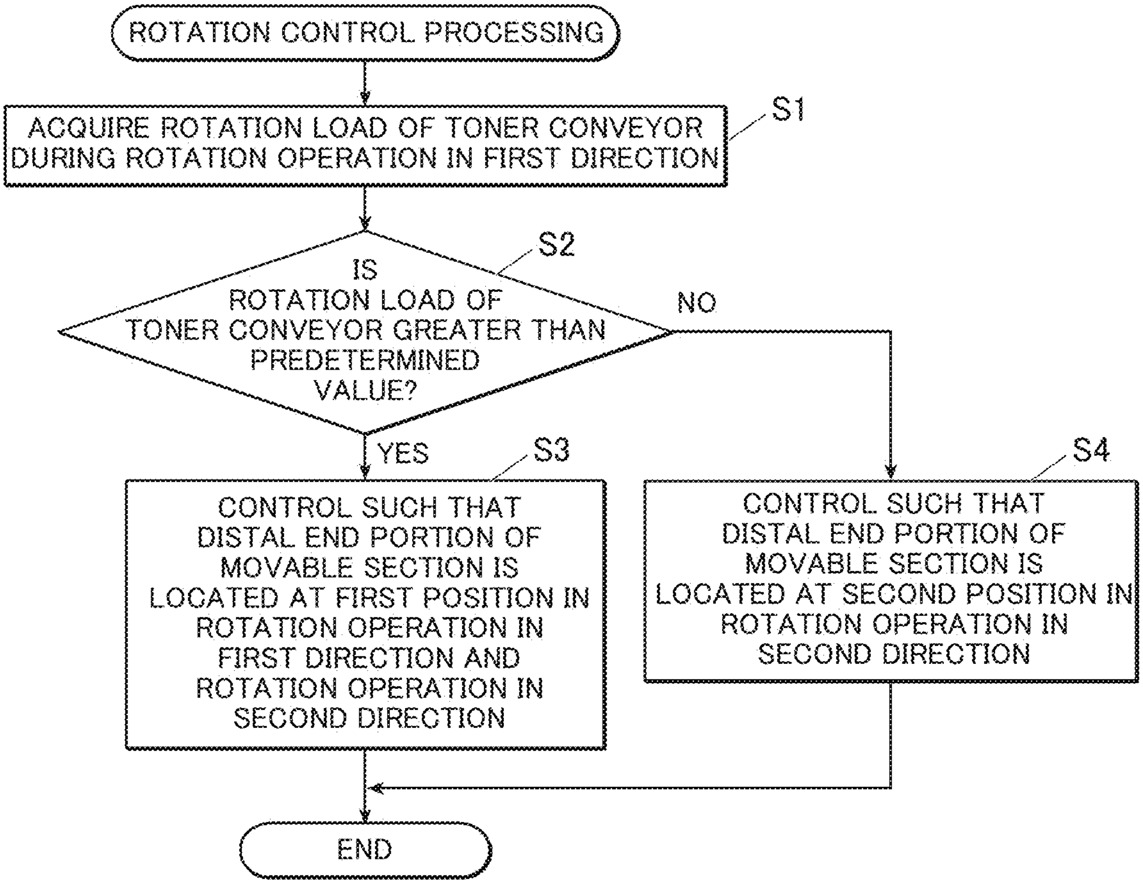
FIG. 18 is a flowchart of rotation control processing according to a modification example of the second embodiment.

In the present modification example, the controller 100 executes rotation control processing illustrated in FIG. 18.

(Rotation Control Processing)

The controller 100 acquires the rotation load of the toner conveyor 202 detected by the detector 231 during the rotation operation in the first direction (step S1).

Next, the controller 100 determines whether the rotation load of the toner conveyor 202 acquired in step S1 is greater than a predetermined value. The predetermined value is set in advance and is, for example, 500 gf·cm.

The case where the rotation load of the toner conveyor 202 is greater than the predetermined value (step S2; YES) will be described. This is a case where, when the drive transmitter 214 rotates in the second direction, the load that the toner conveyor 202 receives from the developer is greater than the conveying force with which the toner conveyor 202 conveys the developer by rotating in the second direction. That is, in the rotation operation in the second direction, the toner conveyor 202 does not rotate and remains stopped.

In this case, the controller 100 controls the solenoid 232 such that the distal end portion 232*b* of the movable section 232*a* is located at the first position B1 in the rotation operation in the first direction and the rotation operation in the second direction (step S3), and ends the rotation control processing.

On the other hand, a case where the rotation load of the toner conveyor 202 is equal to or less than the predetermined value (step S2; NO) will be described. This is the case where the load that the toner conveyor 202 receives from the developer when the drive transmitter 214 rotates in the second direction is equal to or smaller than the conveying force with which the toner conveyor 202 conveys the developer by rotating in the second direction.

In this case, the controller 100 controls the solenoid 232 such that the distal end portion 232*b* of the movable section 232*a* is located at the first position B1 in the rotation operation in the first direction. In addition, the controller 100 controls the solenoid 232 such that, in the rotation operation in the second direction, the distal end portion 232*b* of the movable section 232*a* is located at the second position B2 (step S4), and ends the rotation control processing.

That is, in the rotation control processing, the controller 100 does not restrict the rotation of the toner conveyor 202 in a case where the rotation load of the toner conveyor 202 detected by the detector 231 is greater than the predetermined value. The controller 100 restricts the rotation of the toner conveyor 202 in a case where the rotation load of the toner conveyor 202 detected by the detector 231 is a predetermined value or less. The controller 100 functions as a second controller. The solenoid 232 and the protrusion member 233 function as a restricting member (restrictor).

<7. Others>

The developing device 412 may include a sealing member such as urethane foam or a soft sealing material for preventing leakage of the toner stored in the developer housing 201. The seal member is a soft member capable of filling the gap of the developer housing 201. In a case where the toner conveyor 202 is connected to the preventer 208 via a seal member, vibration due to the impact force F4 received by the toner conveyor 202 is suppressed by the clastic property of the seal member.

Therefore, it is preferable that the toner conveyor 202 is connected to the preventer 208 via a rigid body. In this case, the vibration due to the impact F4 received by the toner conveyor 202 is not easily suppressed and is efficiently transmitted to the preventer 208. Thus, the toner deposited on the preventer 208 can be efficiently crushed. The rigid body includes a rigid body in which a plurality of rigid bodies are fastened by a fastening member, or a rigid body in which a plurality of rigid bodies are bonded and integrated by a cured adhesive or the like.

In the second operation, when the drive transmitter 214 applies the impact force F4 to the toner conveyor 202, a sound is generated by the impact. The user can recognize that the second operation is being performed by the sound. However, when the surroundings of the image forming apparatus 1 are quiet, the user may be anxious about the sound.

Therefore, in the present embodiment, the drive transmitter 214 performs the second operation at the same timing as the charging cleaning operation performed in the image forming apparatus 1. The charging cleaning operation is an operation in which a charging cleaning member that cleans the charging wire included in the charging device 414 reciprocates in a direction along the charging wire. In the image forming apparatus 1, the controller 100 executes the charging cleaning operation every time 3,000 sheets of paper having the A4 size are printed. The controller 100 executes the charging cleaning operation every time a print job is completed.

Thus, the sound generated in the second operation and the sound generated in the charging cleaning operation are generated at the same time. Therefore, only the sound generated in the second operation of the present embodiment is not conspicuous.

That is, the second operation of the present embodiment is performed at the same time as an operation different from the second operation performed in the image forming apparatus 1.

The drive transmitter 214 may perform the second operation during the operation of the fan included in the image forming apparatus 1. The fans are a fan that prevents a temperature increase in the image forming apparatus 1 and an ozone fan that causes a filter to adsorb ozone generated in the image forming apparatus 1 to perform a cleaning process.

Thus, the sound generated in the second operation and the sound generated by the operation of the fan are generated at the same time. Therefore, only the sound generated in the second operation is not conspicuous.

The drive transmitter 214 may perform the second operation during operation of the post-processing apparatus connected to the image forming apparatus 1. The post-processing apparatus is an apparatus that performs post-processing on the sheet on which the image has been formed, such as stapling, punching, sorting, saddle stitching, and tri-folding.

Thus, the sound generated in the second operation and the sound generated by the operation of the post-processing apparatus are generated at the same time. Therefore, only the sound generated in the second operation is not conspicuous.

<8. Effect>

As described above, the image forming apparatus 1 according to the present embodiment includes the developing device 412 that causes toner to adhere to a latent image via a toner carrier (the developing roller 204) disposed opposite a latent image carrier (the photosensitive drum 413) on which the latent image is formed, to develop the latent image.

The developing device 412 includes a drive transmitter 214 that transmits a driving force to a toner conveyor 202 that conveys toner.

The drive transmitter 214 switches between a first operation of transmitting a driving force for conveying toner to the toner conveyor 202 and a second operation of vibrating a preventer 208 provided in the developing device 412 to prevent scattering of toner.

Thus, the preventer 208 can be vibrated by the drive transmitter 214 that is a member for transmitting a driving force for conveying toner to the toner conveyor 202. That is, a dedicated component for applying vibration to the preventer 208 is not required. Therefore, it is possible to suppress an image defect due to the toner accumulated in the developing device 412 while suppressing an increase in the size or cost of the apparatus.

The image forming apparatus 1 according to the present embodiment includes the first controller (controller 100) that causes the drive transmitter 214 to switch between the first operation and the second operation by switching the rotation direction of the drive transmitter 214.

Thus, the first operation and the second operation performed by the drive transmitter 214 can be easily switched by switching the rotation direction of the drive transmitter 214.

In the image forming apparatus 1 according to the present embodiment, the first controller (controller 100) causes the drive transmitter 214 to rotate in the first direction in a state where the engaged portion 214*a* of the drive transmitter 214 and the engaging portion 202*e* of the toner conveyor 202 are engaged with each other. Thus, the first controller causes the drive transmitter 214 to perform, as the first operation, transmission of a driving force larger than the rotation load of the toner conveyor 202 to the toner conveyor 202 to rotate the toner conveyor 202 in the first direction, thereby conveying toner.

The first controller causes the drive transmitter 214 to rotate in a second direction that is a direction opposite to the first direction, and causes the drive transmitter 214 to perform the second operation in a state where the rotation of the toner conveyor 202 is stopped.

Thus, the first operation and the second operation performed by the drive transmitter 214 can be easily switched only by switching the rotation direction of the drive transmitter 214.

The image forming apparatus 1 according to the present embodiment includes a restrictor (the one way clutch 220, or the solenoid 232 and the protrusion member 233) that restricts the toner conveyor 202 from rotating in the second direction when the drive transmitter 214 rotates in the second direction.

Thus, image defect such as screw pitch unevenness can be prevented from occurring.

In the image forming apparatus 1 according to the present embodiment, the drive transmitter 214 transmits the driving force to the toner conveyor 202 via the engaged portion 214*a* of the drive transmitter 214 and the engaging portion 202*e* of the toner conveyor 202 that are in the engaged state in the first operation.

Thus, the driving force for conveying toner can be transmitted to the toner conveyor 202 with a simple configuration.

In the image forming apparatus 1 according to the present embodiment, the drive transmitter 214 is displaceable along the axial direction of the toner conveyor 202. The drive transmitter 214 performs the second operation when displaced from the position in the state where the engagement between the engaged portion 214*a* and the engaging portion 202*e* is released to the position in the state where the engaged portion 214*a* and the engaging portion 202*e* are engaged with each other.

Thus, the preventer 208 can be vibrated with a simple configuration.

In the image forming apparatus 1 according to the present embodiment, the developing device 412 includes an elastic member 213. The drive transmitter 214 performs the second operation using the elastic force of the elastic member 213.

Thus, the preventer 208 can be vibrated with a simple configuration.

The image forming apparatus 1 according to the present embodiment includes the detector 231 that detects a rotation load of the toner conveyor 202. The image forming apparatus 1 includes a second controller (controller 100) that does not regulate the rotation of the toner conveyor 202 when the rotation load detected by the detector 231 is greater than a predetermined value and regulates the rotation of the toner conveyor 202 when the rotation load is less than or equal to the predetermined value.

Thus, image defect such as screw pitch unevenness can be prevented from occurring.

In the image forming apparatus 1 according to the present embodiment, the toner conveyor 202 is connected to the preventer 208 via a rigid body.

Thus, the vibration due to the impact F4 received by the toner conveyor 202 is less likely to be suppressed and is efficiently transmitted to the preventer 208. Thus, the toner deposited on the preventer 208 can be efficiently crushed.

In the image forming apparatus 1 according to the present embodiment, the second operation is performed at the same time as an operation different from the second operation performed in the image forming apparatus 1.

Thus, for example, when the surroundings of the image forming apparatus 1 are quiet, only the sound generated in the second operation does not stand out.

Although specific description has been given above based on the embodiments according to the present invention, the detailed configuration of each device constituting the image forming apparatus 1 and the detailed operation of each device can be appropriately changed without departing from the spirit of the present invention.

For example, although the developing device 412 is a two-component development system in the embodiment described above, the developing device 412 may be one-component development system.

In the above description, an example in which a hard disk drive (HDD), a semiconductor nonvolatile memory, or the like is used as a computer-readable medium of the program according to the present invention has been disclosed, but the present invention is not limited to this example. As another computer-readable medium, a portable recording medium such as a CD-ROM can be applied. A carrier wave is also applied as a medium for providing data of the program according to the present invention via a communication line.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-166074 filed on Sep. 27, 2023 is incorporated herein by reference in its entirety.

What is claimed is:

1. An image forming apparatus comprising a developing device that develops a latent image by causing toner to adhere to the latent image via a toner carrier disposed opposite a latent image carrier on which the latent image is formed, wherein the developing device includes a drive transmitter that transmits a driving force to a toner conveyor that conveys the toner, and the drive transmitter performs switching between a first operation of transmitting the driving force for conveying the toner to the toner conveyor and a second operation of vibrating a preventer that is provided in the developing device and prevents the toner from scattering.

2. The image forming apparatus according to claim 1, further comprising a hardware processor that causes the drive transmitter to switch between the first operation and the second operation by switching a rotation direction of the drive transmitter.

3. The image forming apparatus according to claim 2, wherein the hardware processor rotates the drive transmitter in a first direction in a state where an engaged portion of the drive transmitter and an engaging portion of the toner conveyor are engaged with each other, to cause the drive transmitter to transmit, as the first operation, a driving force greater than a rotation load of the toner conveyor to the toner conveyor and to convey the toner by rotating the toner conveyor in the first direction, and rotates the drive transmitter in a second direction opposite to the first direction to cause the drive transmitter to perform the second operation in a state where rotation of the toner conveyor is stopped.

4. The image forming apparatus according to claim 3, further comprising a restrictor that restricts the toner conveyor from rotating in the second direction when the drive transmitter rotates in the second direction.

5. The image forming apparatus according to claim 1, wherein the drive transmitter transmits the driving force to the toner conveyor via an engaged portion of the drive transmitter and an engaging portion of the toner conveyor that are in an engaged state in the first operation.

6. The image forming apparatus according to claim 5, wherein the drive transmitter is displaceable along an axial direction of the toner conveyor and performs the second operation when the drive transmitter is displaced from a position in a state where engagement between the engaged portion and the engaging portion is released to a position in a state where the engaged portion and the engaging portion are engaged.

7. The image forming apparatus according to claim 1, wherein the developing device includes an elastic member, and the drive transmitter performs the second operation using an elastic force of the elastic member.

8. The image forming apparatus according to claim 1, further comprising a detector that detects a rotation load of the toner conveyor, wherein the hardware processor does not restrict rotation of the toner conveyor when the rotation load detected by the detector is larger than a predetermined value and restricts the rotation of the toner conveyor when the rotation load is equal to or smaller than the predetermined value.

9. The image forming apparatus according to claim 1, wherein the toner conveyor is connected to the preventer via a rigid body.

10. The image forming apparatus according to claim 1, wherein the second operation is performed at a same time as an operation different from the second operation performed in the image forming apparatus.

* * * * *